United States Patent
Vincent

(10) Patent No.: US 6,292,215 B1
(45) Date of Patent: Sep. 18, 2001

(54) APPARATUS FOR REFERENCING AND SORTING IMAGES IN A THREE-DIMENSIONAL SYSTEM

(75) Inventor: Robert S. Vincent, Wakefield, MA (US)

(73) Assignee: Transcenic L.L.C., Lake Charles, LA (US)

(*) Notice: Subject to any disclaimer, the term of this patent is extended or adjusted under 35 U.S.C. 154(b) by 0 days.

(21) Appl. No.: 08/900,046

(22) Filed: Jul. 24, 1997

Related U.S. Application Data

(63) Continuation of application No. 08/383,471, filed on Jan. 31, 1995, now abandoned.

(51) Int. Cl.[7] .......................... H04N 5/225; H04N 5/232
(52) U.S. Cl. ..................... 348/169; 348/142; 348/213; 348/232; 348/333.02; 348/373; 348/552; 396/427; 396/429
(58) Field of Search .................. 348/61, 13, 15, 348/135, 142, 143, 169, 207, 211, 213, 231–233, 333, 334, 373–375, 552; 358/906, 909.1; 396/13, 429, 419, 427; 386/95, 107, 108; 318/649; 381/74; 600/587

(56) References Cited

U.S. PATENT DOCUMENTS

| | | | | |
|---|---|---|---|---|
| 4,084,184 | * | 4/1978 | Crain ..................................... | 358/93 |
| 4,169,666 | * | 10/1979 | Slater et al. ........................... | 352/85 |
| 4,561,063 | * | 12/1985 | Craig et al. .......................... | 364/559 |
| 4,855,822 | * | 8/1989 | Narendra et al. .................... | 358/103 |
| 5,075,861 | * | 12/1991 | Hasson ................................ | 318/649 |
| 5,124,938 | * | 6/1992 | Algrain ............................... | 318/649 |
| 5,189,402 | * | 2/1993 | Naimark et al. .................... | 340/709 |
| 5,262,867 | * | 11/1993 | Kojima ............................... | 358/906 |
| 5,335,072 | * | 8/1994 | Tanaka et al. ...................... | 348/232 |
| 5,490,075 | * | 2/1996 | Howard et al. ..................... | 364/459 |
| 5,523,783 | | 6/1996 | Cho ..................................... | 348/157 |
| 5,645,077 | * | 7/1997 | Foxlin ................................. | 600/587 |
| 5,689,611 | * | 11/1997 | Ohta .................................... | 358/906 |
| 5,768,640 | * | 6/1998 | Takahashi ........................... | 396/429 |
| 5,854,843 | * | 12/1998 | Jacknin ............................... | 381/74 |
| 5,879,223 | * | 4/1999 | Tritchew ............................. | 396/13 |
| 5,881,321 | * | 3/1999 | Kivolowitz ......................... | 396/429 |

\* cited by examiner

Primary Examiner—Wendy Garber
Assistant Examiner—Ngoc-Yen Vu
(74) Attorney, Agent, or Firm—Foley & Lardner; James A. Sprowl

(57) ABSTRACT

An image system which captures, along with the images, information defining both the position and the orientation of the camera along with the distance to the subject. A video camera is attached to three accelerometers, two gyroscopes, and a rangefinder. Data gathered from these devices and defining the pitch, yaw, and roll of the camera, the camera's acceleration, and the distance to the subject is captured and recorded along with video images. The video images are later stored within a computer's data base along with data defining the position and orientation of the camera and the distance to the subject for each image, this latter data being computed from the captured data. The images may then be presented to the user in a three-dimensional display in which the user can navigate through the images using a joystick device, with the images located in positions corresponding to the positions in space of the objects that were imaged.

19 Claims, 29 Drawing Sheets

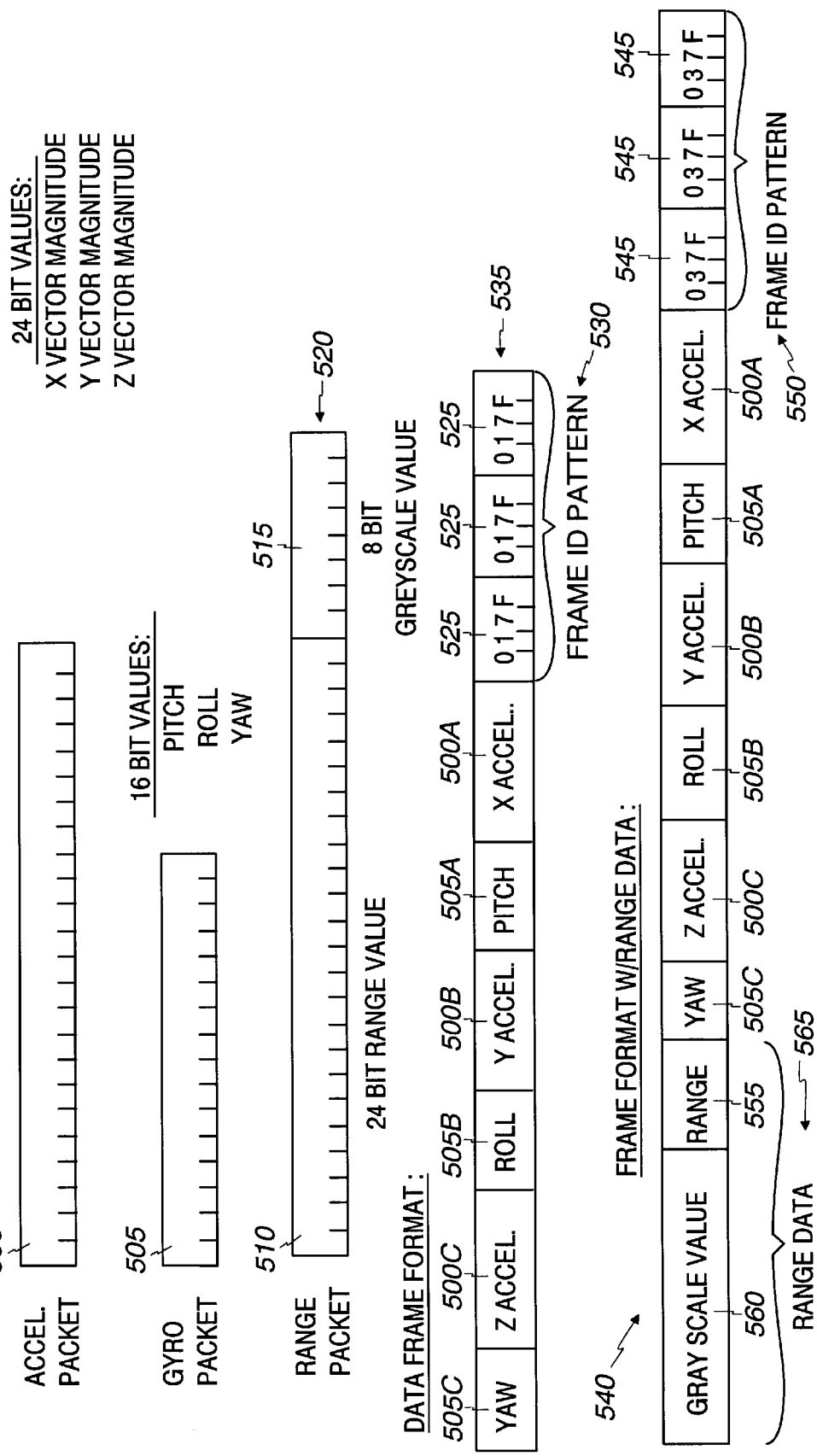

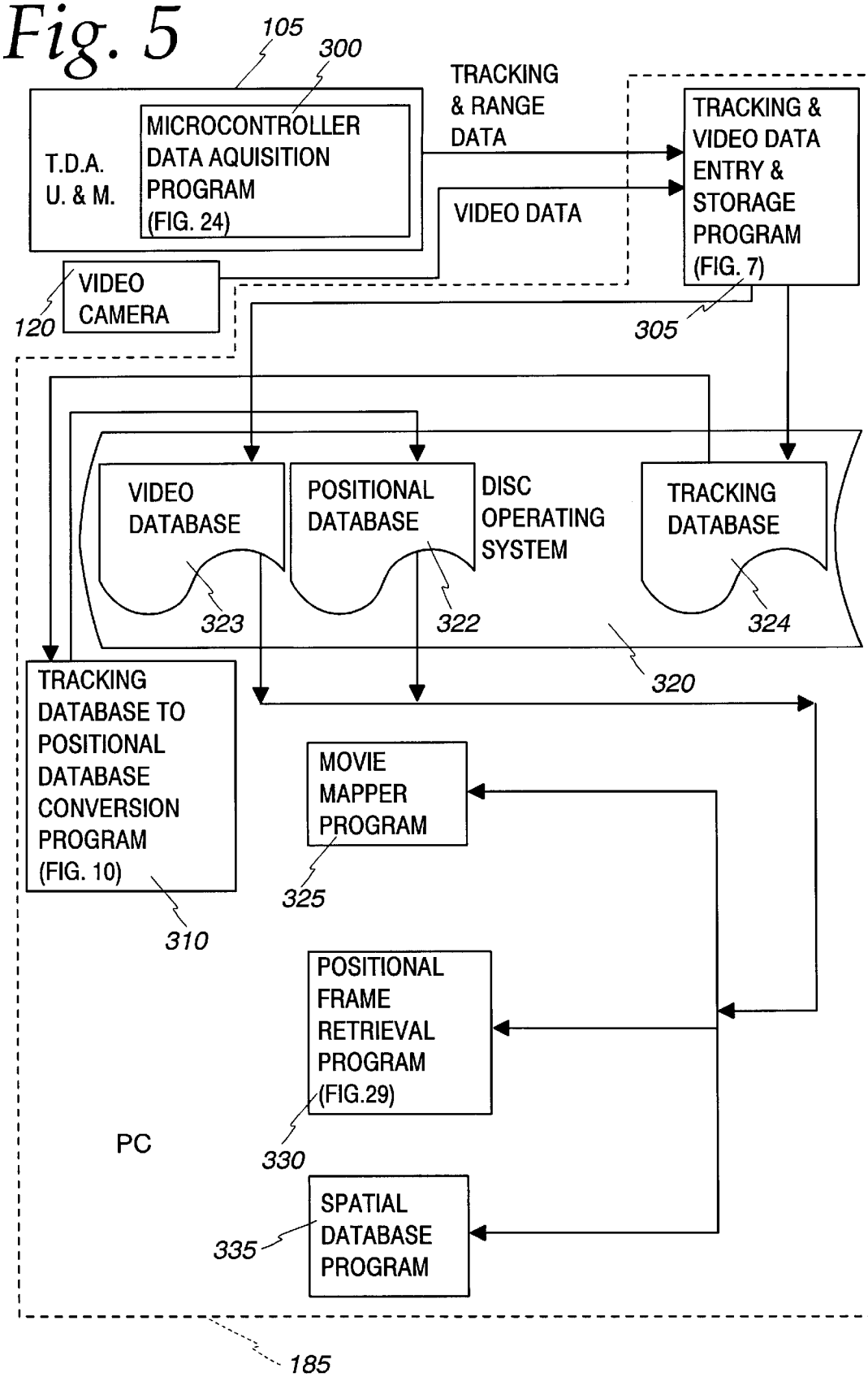

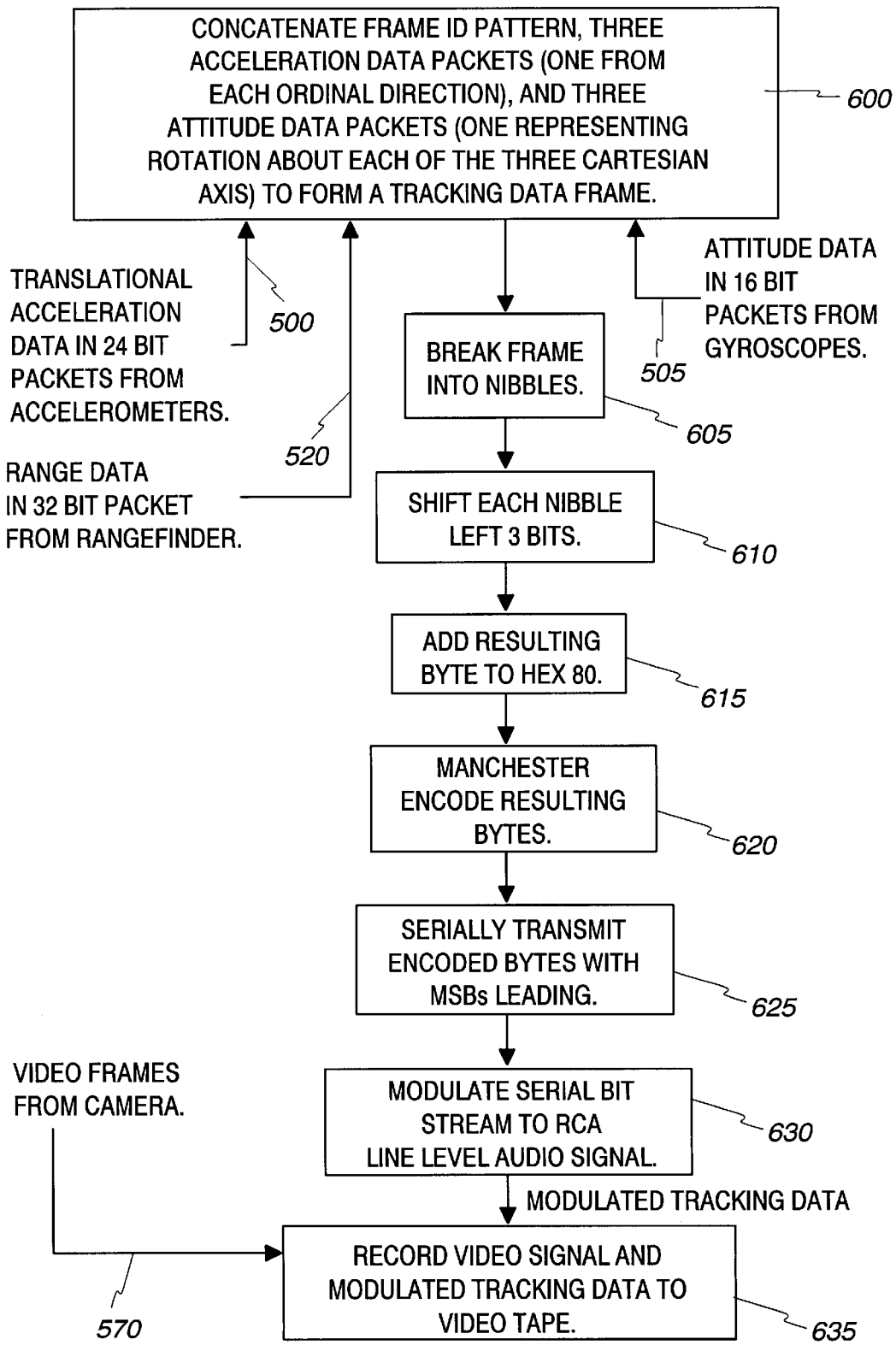

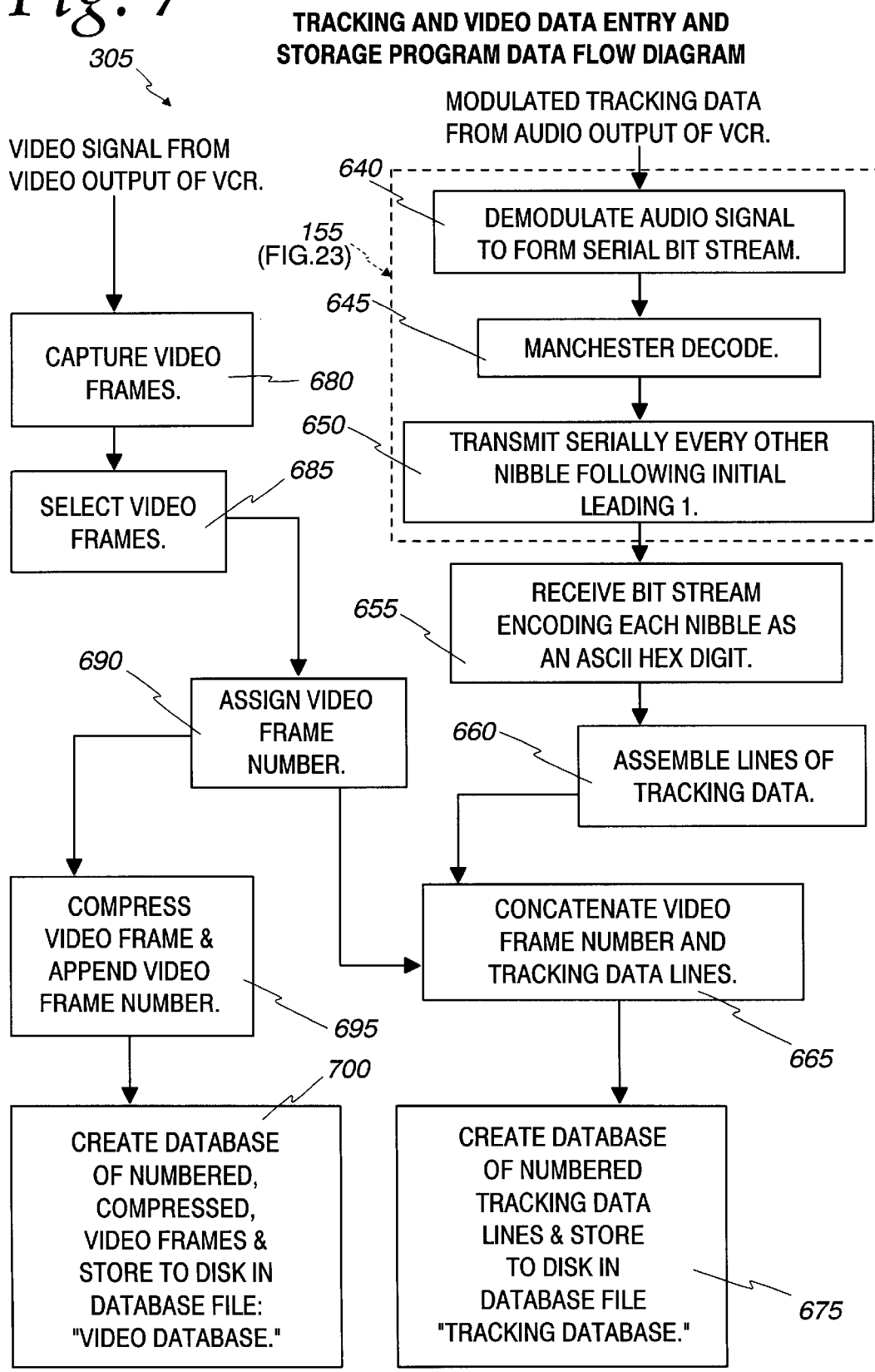

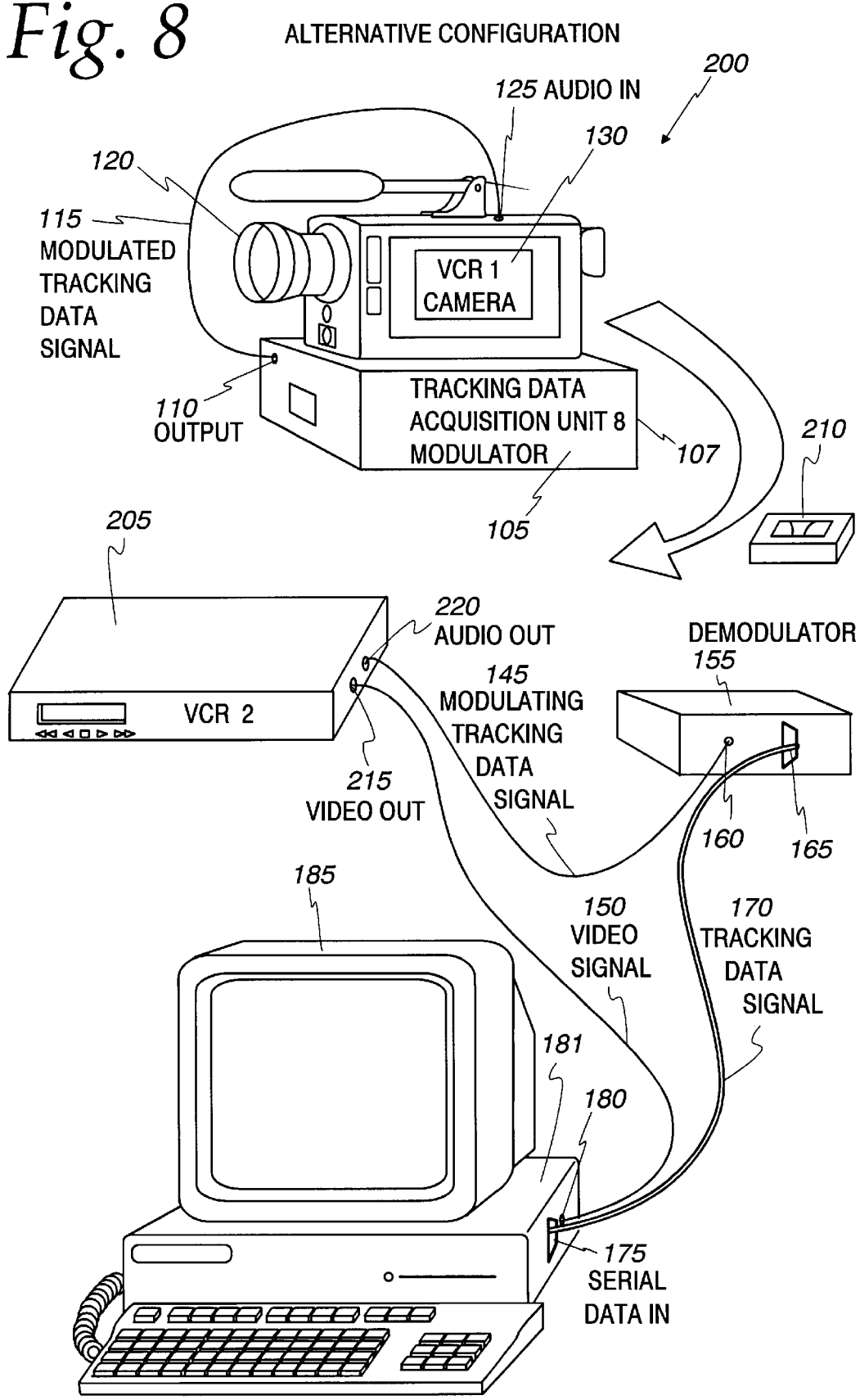

Fig. 9   POSITIONAL DATA RECORD FORMAT

QUATERNION POSITION NOTATION RECORD FORMAT (715)

| POS | SP | VF# | SP | VF# | SP | X | SP | Y | SP | Z | SP | V_W | SP | V_X | SP | V_Y | SP | V_Z |
|---|---|---|---|---|---|---|---|---|---|---|---|---|---|---|---|---|---|---|
| 720 | 725 | 730 | 725 | 730 | 725 | 735 | 725 | 740 | 725 | 745 | 725 | 750 | 725 | 755 | 725 | 766 | 725 | 770 |

DIRECT ANGULAR NOTATION FORMAT (775)

| POS | SP | VF# | SP | VF# | SP | X | SP | Y | SP | Z | SP | SP | R_X | SP | R_Y | SP | R_Z |
|---|---|---|---|---|---|---|---|---|---|---|---|---|---|---|---|---|---|
| 720 | 725 | 730 | 725 | 730 | 725 | 735 | 725 | 740 | 725 | 745 | 725 | 725 | 780 | 725 | 785 | 725 | 790 |

*Fig.* 29

APPARATUS FOR REFERENCING AND SORTING IMAGES IN A THREE-DIMENSIONAL SYSTEM

This application is a continuation, of application Ser. No. 08/383,471 filed Jan. 31, 1995, now abandoned.

FIELD OF THE INVENTION

This invention relates to the referencing and sorting of images in a three-dimensional system. More particularly, it relates to a system having an image capturing device that captures images of objects together with data defining the absolute position of the image capturing device and the relative position of the object relative to that device, and having an image retrieval device that retrieves and presents the images organized spatially in accordance with the captured data.

BACKGROUND OF THE INVENTION

The editing of films and video images, i.e., to rearrange action sequences, is well known. However, the movie and video cameras used to capture the images that are later edited do not store with those images any machine-understandable record of image and camera position. Accordingly, the edited films and videos permit one to view the images in only one predetermined order, determined by the editor. If some other ordering of the image presentation is desired, it must be achieved through a difficult manual editing process.

A computerized, interactive editing process is described in a doctoral thesis "Cognitive Space in the Interactive Movie Map: An Investigation of Spatial Learning in Virtual Environments", by Robert Mohl, 1981, submitted at MIT. In a demonstration carried out using images recorded at Aspen, Colorado, the viewer is permitted to select film clips taken by a camera that is arranged to simulate driving down a street. At each intersection, the viewer chooses to turn left, turn right, or to proceed straight ahead. The viewer thereby simulates driving around streets in Aspen, Colorado.

In other fields, it is known to gather, along with images, information concerning the position of the camera. Governmental and private agencies use satellites and airplanes to record images of positionally referenced data, such as land features or clouds. Each image frame contains positional references to the image tilt or plane of the camera. Present methods commonly either constrain the orientation of the camera to a fixed position, i.e. up and down, or use features captured in the image frames to derive relative positions and orientations of successive images when combining the image frames to form a map or the like.

Devices are known which combine images by matching features common to each of two or more images, i.e. superimposing. These devices must compensate for inevitable distortions of translation and rotation. For example, if an escalator is imaged, and if the images are matched by super-imposing geometric forms (i.e. steps), distorted positional encoding occurs.

Virtual Reality pioneer Jaron Lanier has said that the field of Virtual Reality and computer simulation need a device to collect spatially referenced data for importation into these environments. His term for this device is a "world sucker." The present invention represents one possible way to accomplish this objective.

One aspect of the present invention is recording positional data along with images. A number of methods are known whereby one may locate an object and describe the position of an object relative to a positional reference. For example, a magnetic device is known which can determine its position and orientation within a known magnetic field. Satellite systems and radio signal triangulation can also be used to determine position precisely. Inertial position determination systems are also known and are widely used in inertial navigational —systems.

Inertia describes the tendency of a mass to resist all changes in the direction or magnitude of its velocity that is, the tendency of a mass at rest to stay at rest and the tendency of a moving mass to continue moving in a straight line. Inertial resistance can be used as a means to quantify spatial data, since it has both magnitude and direction.

Gimbals are used in such inertial navigation systems. Gimbals are devices consisting of two rings mounted on axes at right angles to each other, so that an object such as a ship's compass can remain suspended in a horizontal plane between the gimbals regardless of the motion of the ship.

An inertial platform is a system of accelerometers mounted upon an inertial platform supported by gimbals and used in inertial navigation systems. The book *Gyroscopes: Theory and Design* describes several inertial platforms. This book explains that vehicle accelerations (changes in speed or direction of motion) can be measured by means of accelerometers, each having an axis aligned with coordinate axes of the particular reference frame used by the inertial navigation system. This book explains that special precautions must be taken to maintain continuously proper accelerometer alignment. The book further states "It is necessary therefore, to mount the accelerometers on a gimbaled platform referred to an inertial platform—the orientation of which remains stabilized . . . independent of changes in orientation of the vehicle".

This book explains further that rotation about three axes was recognized as a necessary component of navigation in air space by the Wright brothers, who called rotation about the first axis "roll," rotation about the second axis "pitch," and rotation about the third axis "yaw." This book says that in a three-dimensional inertial navigation system, "the inertial platform must comprise three mutually orthogonal accelerometers and be gyro-stabilized about the roll, pitch, and yaw axes by the action of the separate servos." A servo is a feedback system consisting of a sensing element, an amplifier, and a slave power source that senses the reaction of a gyroscope to twist and that responds by countering the twist to stabilizing the inertial platform.

A "two-degree-of-freedom" gyro is one which can sense angular motion of the platform about two axes simultaneously, thereby enabling only two gyros to stabilize an internal platform about three axes. Mathematical equations for calculation of corrections for gravitational acceleration are included in the above book.

Chapter 7 of *Inertial Navigation Systems* by Charles Boxmeyer, McGraw-Hill, 1964 is entitled "Some Inertial-navigation-system Designs." This chapter discusses a variety of assemblies of components designed to solve various inertial-navigation problems. It describes the transformations that are necessary to recover true inertial frame acceleration information from an attitude-sensed arrangement of accelerometers which are not gimbaled. One system described has two accelerometers mounted on a gimbaled platform: one is mounted upon the azimuth (yaw) axis, to measure roll and pitch; and the second is mounted normal (perpendicular) to the azimuth axis. The platform includes three gimbals. Another system described provides five gimbals for roll, pitch, azimuth, latitude, and longitude. A third system described provides no torquing signal to the gyro with an azimuth axis. This system allows for a single fixed (vertical) orientation. Another system described forces the accelerometer input axes into a preferred alignment with respect to the earth. It is a four-gimbal system where the innermost gimbal is maintained non-rotational by means of three integrating gyroscopes all of which are mounted upon the fourth gimbal, and three accelerometers are mounted upon the stabilized inner platform.

At one point, this chapter says: "If the gyros and accelerometer are mounted directly to the frame of a vehicle, and the stable table dispensed with, it is obvious that a considerable saving in size and weight would result. It is also obvious that the transformation theory that has been used previously could be extended to apply to this case and that position and velocity could be computed by performing operations on the gyro and accelerometer outputs. The physical indications of north, east, and the vertical would not be available, but information would be available in the form of computer outputs referring these directions to the vehicle frame. "A difficulty with this procedure is that the rapid motion of the vehicle in roll, pitch, and yaw would subject the gyros to angular-rate inputs over a much greater range than . . . [they] encounter when they are mounted on the gimbals of a stable table, . . . . Since the gyros are forced to have the same angular velocity as the vehicle, they must be connected as rate gyros....

Assuming, however, that the sensing components have sufficient accuracy to make the mechanization of such a system a worthwhile enterprise, we proceed to discuss the design of a system using three accelerometers and three gyros which are mounted directly on the frame of the vehicle."

A satellite global positioning system based ground video mapping system is described in GPS WORLD, February, 1994, which states "Using two vans equipped with video cameras, computers, and an integrated system of GPS, inertial, and wheel-turn sensors for positioning, Global Visions provides drive by digital maps."

SUMMARY OF THE INVENTION

An object of this invention is providing an image data gathering device which encodes positional and/or spatial information by capturing both camera position and camera orientation information along with image data. This information permits images to be joined or sequenced for viewing without the distortions that can result from attempting to match the edges of adjoining images together.

A further object of this invention is providing three-dimensional image reconstruction of objects using frames shot from different viewpoints and perspectives through the provision of a triangulation reference.

Still another object of this invention is providing a camera path map which allows images to be selected based upon the position and orientation of the camera from the map. For example, an operator cam learn the location of an object in a film clip, such as an escalator. Images of the escalator may then be quickly and automatically located by selecting other frames which point to that same escalator from different camera positions.

Another object of the invention is providing a compact and practical image and positional data recording system which uses commonly available equipment. A system having accelerometers mounted directly upon the recorder, eliminating the need for a restrained or gimballed platform, permits greater freedom of motion for the recording device as well as reduced cost and complexity.

Briefly described, the invention resides in a video camera that is integrated with a tracking data acquisition unit containing accelerometers and gimbal-mounted gyroscopes, and optionally a rangefinder. As the operator of the video camera moves about taking a motion picture of the environment, a microprocessor and logic associated with the accelerometers and gyroscopes senses all rotational motions of the camera by means of sensors associated with the gimbals and senses all translational motions of the camera by means of sensors associated with the accelerometers. And the rangefinder provides information to the microprocessor and logic concerning he distance from the camera to the subject being photographed.

From data presented by these sensors, the microprocessor and logic compute and generate a modulated audio signal that is encoded with a continuous record of acceleration in the X, Y and Z directions as well as with a continuous record of the pitch, roll, and yaw of the camera and of the distance to the subject. This audio tracking information data signal is recorded on the audio track of the same video tape upon which the video images are being recorded by the camera. In this manner, the video tape recording captures, along with the sequence of images, the tracking data from which the precise position of the camera, its precise orientation, and the position of the subject may later be computed.

Later on, the recorded audio tracking information data and video data is played back into a computer.

Images are selected from the sequence of images and are retained, in compressed form, in a database. Each image is then linked to computed positional information that defines, for each image, the location and orientation of the camera and, optionally, the distance to the subject and the subject location. This positional information is derived through computation from the tracking information retrieved from the video tape audio track, as will be explained below.

Next, special computer programs can aid an individual using the computer in navigating through the images, using the positional information to organize the images in ways that make it easy for the user to browse through the images presented on the graphics screen. Several such programs are described below, including a movie mapper program, a positional frame retrieval program, and a spatial database program. The movie mapper program, for example, presents the user with a plan view and an elevational view of the camera path plotted as a graph, and the user, by clicking at any point on this path with a computer mouse, may instantly retrieve and view the image captured at the chosen point as will be explained.

Further objects and advantages are apparent in the drawings and in the detailed description which follows.

BRIEF DESCRIPTION OF THE DRAWINGS

FIG. 4 is a data format diagram showing the tracking data acquisition unit output packet format.

FIG. 5 is a block diagram of the program system modules that represent the major software components of the spatially referenced camera system.

FIG. 6 is a data flow diagram depicting the data flow through the tracking data acquisition unit and modulator 105.

FIG. 7 is a data flow diagram depicting the tracking and video data flow from playback of the video cassette recorder 130, through the demodulation circuit 155, into the personal computer 185 under the control of the data entry and storage program 305.

FIG. 8 is an alternative configuration of the spatially referenced camera apparatus 200, which includes a second video cassette recorder 205 in addition to the spatially reference camera apparatus 100 of FIG. 1.

FIG. 9 is a data format diagram depicting alternative positional data record formats including the quaternion position notation record format 715 and the direct angular notation format 775.

DETAILED DESCRIPTION OF THE PREFERRED EMBODIMENT

Figure 1:
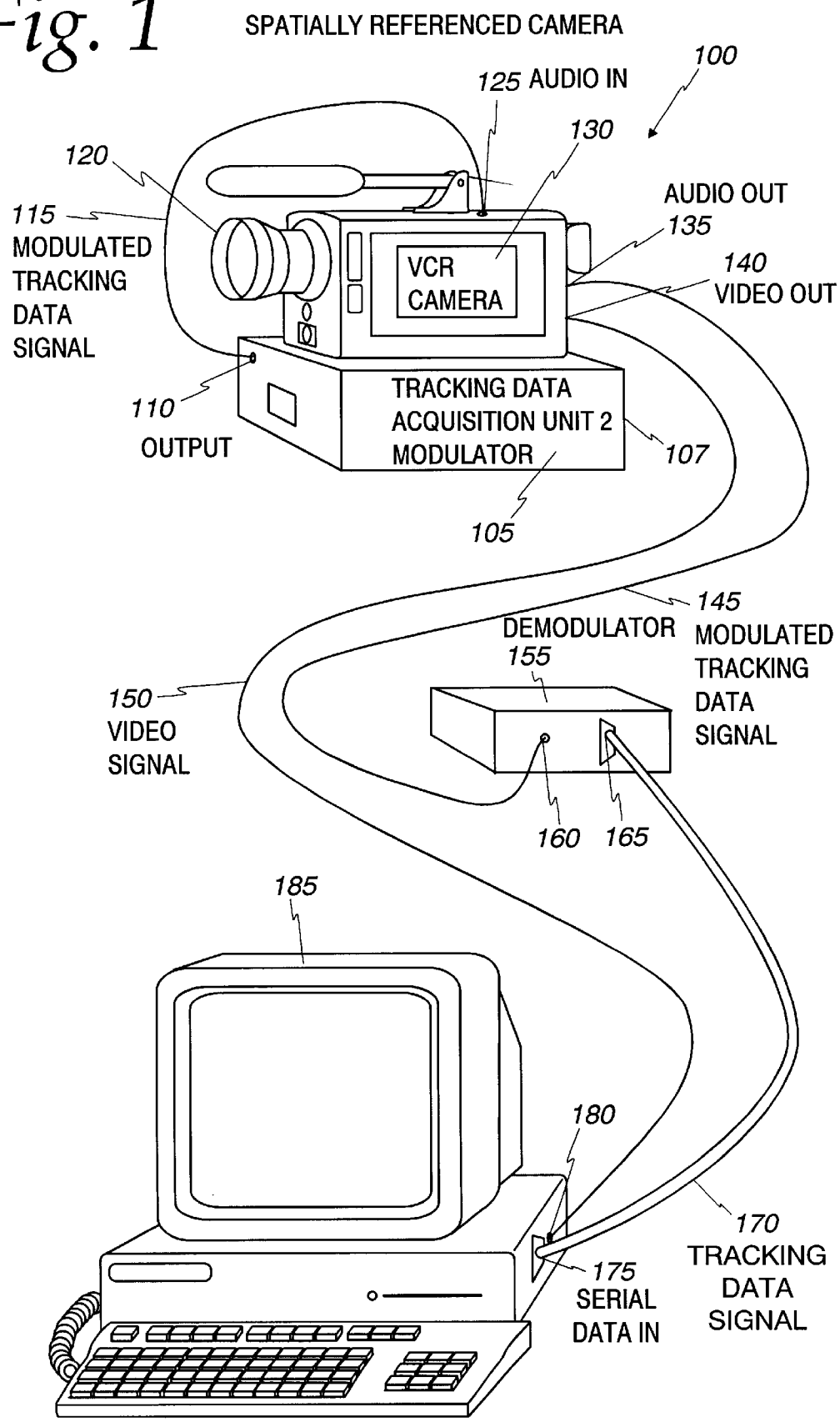
FIG. 1 is a rendering of the spatially referenced video camera 100, which includes a tracking data acquisition unit and modulator 105, a video camera 120 having a video cassette recorder 130, a demodulation circuit 155, and a personal computer 185.

Referring to the drawings and especially to FIG. 1, a spatially referenced video camera is shown embodying the present invention and generally identified by the numeral 100. The spatially referenced video camera 100 includes a tracking data acquisition unit 105 rigidly attached to a video camera 120 having a built-in video cassette recorder 130. As the spatially referenced video camera 100 is operated, video data from the video camera 120 and tracking data from the tracking data acquisition unit 105 are recorded onto a video cassette 210 (FIG. 8) within the recorder 130. Once the desired recordings have been made, the information is transferred to a personal computer 185 for processing and display.

Figure 3:
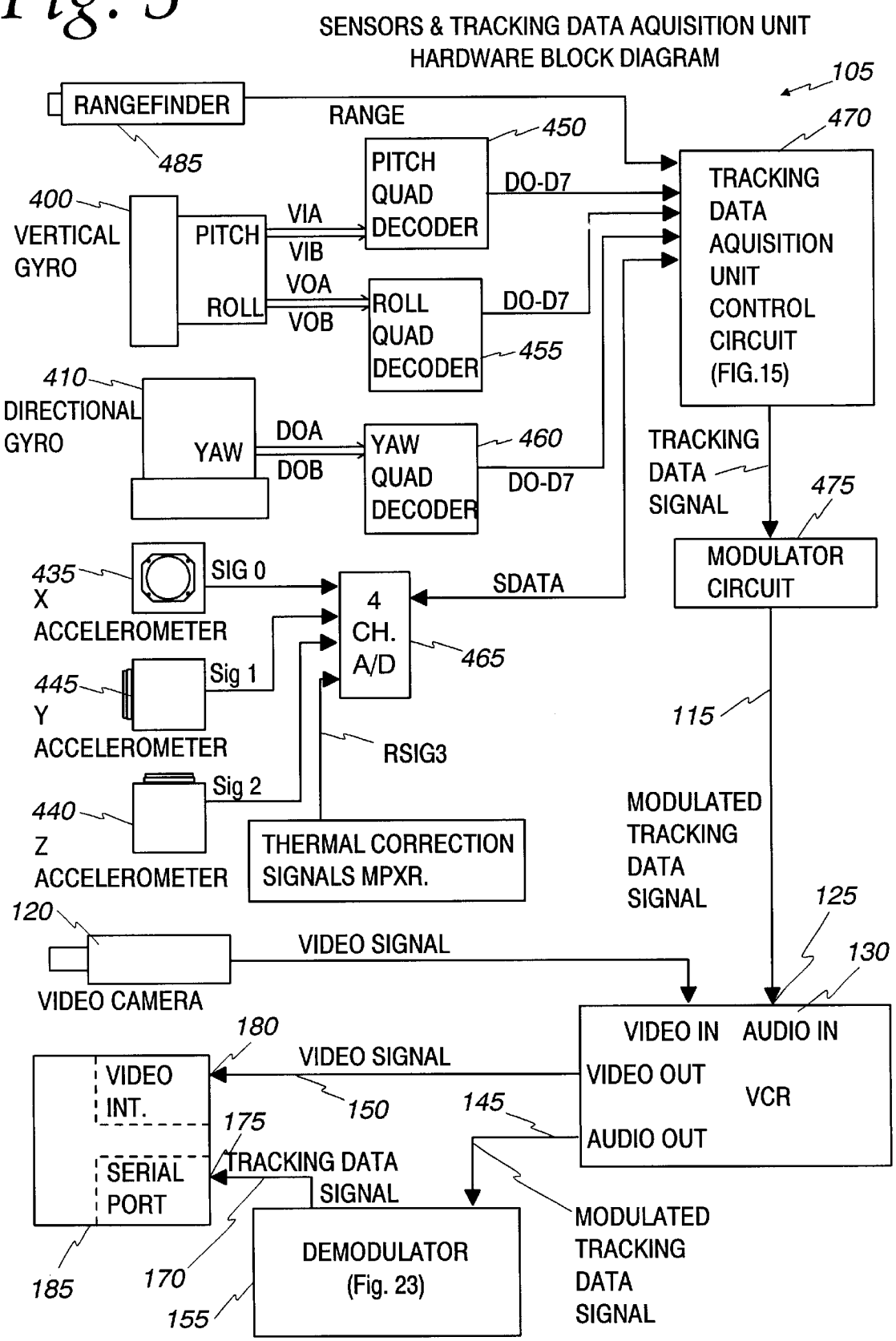
FIG. 3 is a block diagram showing the tracking sensors and the microprocessor based tracking data acquisition unit control circuit 470 according to the invention in the context of the spatially referenced video camera 100.

FIG. 3 presents a block diagram of the camera 100, illustrating its individual hardware components and how they are interconnected by signal paths. The tracking data acquisition unit control circuit 470 contains a data acquisition program 300, and the personal computer 185 contains a number of computer programs. All of these programs, and their data flow relationships, are shown in FIG. 5 which illustrates the camera 100's software components in overview.

With reference to FIG. 5, the video data gathered by the video camera 120 and the position and orientation data gathered by the tracking data acquisition unit and modulator 105 (under the control of the microcontroller data acquisition program 300) are first stored on videotape. Later, they are fed into the personal computer 185. The two data streams are captured by the tracking and video data entry and storage program 305 and are stored, respectively, in a tracking database 324 and in a video database 323.

Once safely stored within the personal computer 185, the tracking database 324 is reprocessed into a positional database 322 by a tracking database to positional database conversion program 310. Now the image retrieval programs 325, 330, and 335 may be called upon to search through the positional database 322, to retrieve images from the video database 323 based upon camera location, camera orientation, and even object location, and to display the images upon the face of the computer 185.

Tracing the data flow through the system components at a more detailed level will explain the functionality of the preferred embodiment of the spatially referenced camera.

Figure 2:
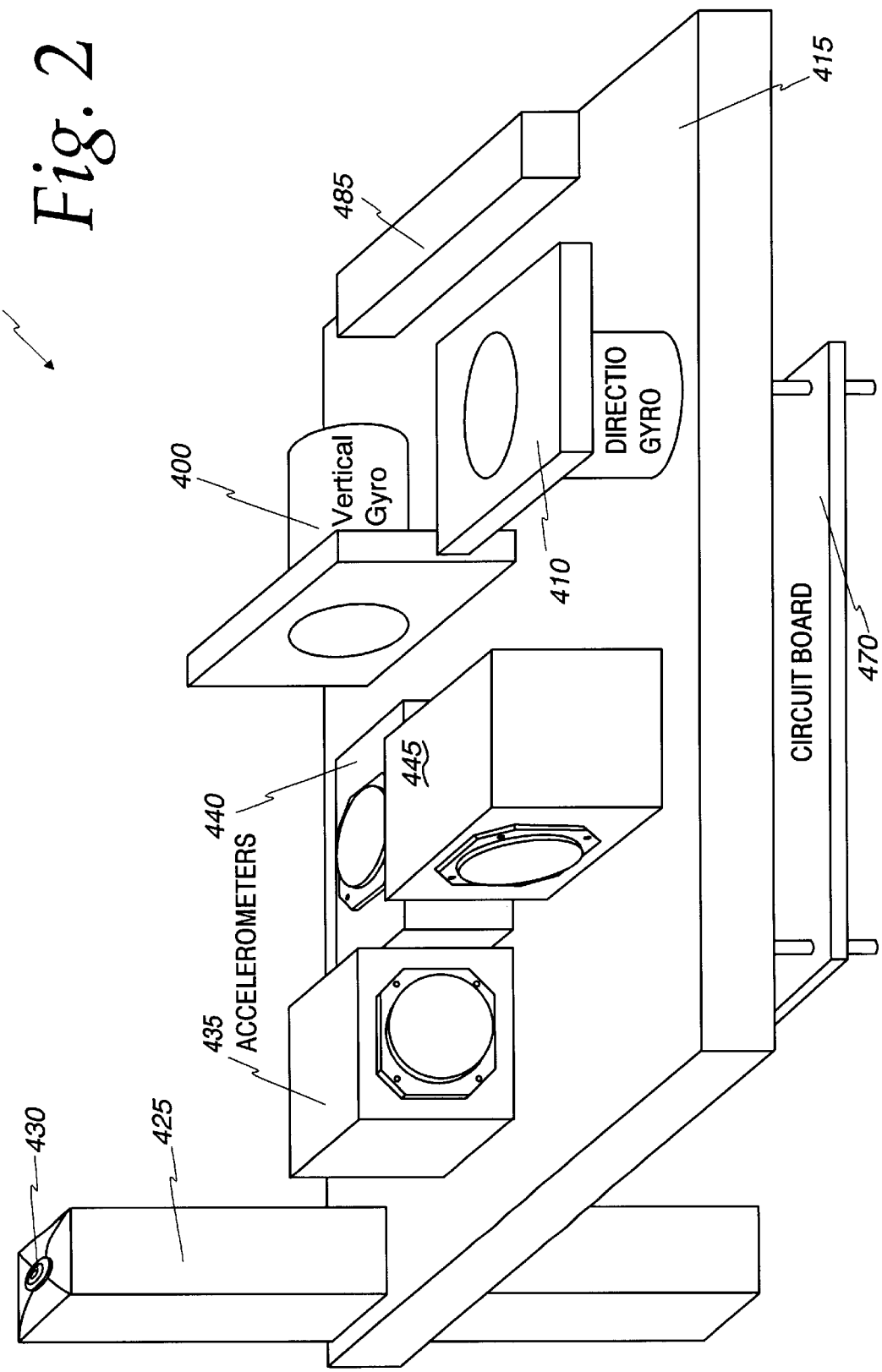
FIG. 2 is a perspective drawing of the tracking data acquisition unit and modulator 105.

First, the video camera 120 (FIGS. 1 and 8) produces a standard video signal that is recorded on the video track of the video cassette 210 (FIG. 8) by the camera's video cassette 210 (FIG. 8) by the camera's video cassette recorder 130. Referring to FIG. 2, the tracking data acquisition unit 105 contains of three orthogonally positioned translational accelerometers 435, 440, and 445; two orthogonally arranged gyroscopes 400 and 410; and a laser rangefinder 485. All six of these sensors are rigidly mounted to an inertial platform 415. Referring to FIG. 3, a control circuit 470 polls the output signals of these sensors and assembles tracking data frames 535 (FIG. 4) which describe the instantaneous, real time orientation and translation acceleration experienced by the spatially referenced video camera 100. A serial bit stream comprised of these tracking data frames is modulated to produce an audio line level modulated tracking data signal 145 which is fed into the audio input 125 of the video cassette recorder 130 and recorded on the audio track of the video cassette 210 alongside the corresponding video information.

Second, the completed recording, stored on the video cassette 210, is played back to the personal computer 185 on any standard video cassette player 205 (FIG. 8) or directly from the camera 120 (FIG. 1). The tracking data is demodulated by a demodulator circuit 155 and is input to the personal computer 185 through a standard serial I/O serial port 175. Simultaneously, the video data is input to the personal computer 185 via a video digitizer input 180. Referring to FIG. 5, a data entry and storage program 305 stores the tracking and video data on the personal computer's disk operating system 320 in a tracking database 324 and in a video database 323. A second program 310 converts the tracking database 324 into a positional database 322.

Third, the set of three display programs 325, 330, and 335 allow a user to view and select video frames based on the relative position or absolute orientation of the camera.

Tracing the data flow through the individual parts of the spatially referenced video camera 100 at the most detailed level discloses how to build the preferred embodiment of the invention.

Referring to FIG. 3, the tracking data acquisition unit 105 continuously measures the translational acceleration and rotational orientation experienced by the spatially referenced video camera 100. To achieve the most accurate measurement of translational acceleration, three accelerometers 435, 440 and 445, such as SUNDSTRAND Model QA-700, are positioned orthogonal to each other and are mounted on a stable inertial platform 415. The accelerometers measure acceleration in each of three dimensions: accelerometer 435 measures acceleration in the X direction, accelerometer 445 measures acceleration in the Y direction, accelerometer 440 measures acceleration in the Z direction. Each accelerometer outputs a voltage signal with an amplitude proportional to the acceleration detected. A multichannel analog to digital converter 465, such as ANALOG DEVICES Model AD7716, receives each accelerometer's output and generates a 24-bit numerical representation of the acceleration experienced in each direction.

Two gyroscopes, such as GYRATION Model GE9100A, a vertical gyroscope 400 and a directional gyroscope 410 are also orthogonally mounted on the stable inertial platform 415 relative to each other. The vertical gyroscope 400, aligned along the X or Y axis, measures yaw (rotation about the Z axis), while the directional gyroscope 410, aligned along the Z axis, measures both roll (rotation about the Y axis) and pitch (rotation about the X axis). (The Y axis is assumed to point in the direction of the camera.) The gyroscopes are dual gimbaled electronic components that generate a pair of square wave signals which are locked out of phase with respect to each other. The sequence of the rising and falling edges of the square waves relative to each other indicates the angular rotation about the gyroscope's measurement axis experienced by the spatially referenced camera 100. Quadrature decoders 450, 455, 460, such as HEWLETT PACKARD Model HCTL2020, receive the three paired square wave signal outputs of the gyroscopes 400, 410; and for each signal pair, they count the relative sequence of rising and falling edges between the two square wave signals to generate a 16-bit numerical representation of the rotation experienced about each axis. An interrupt is generated following any change in these signals. This interrupt causes a central processing unit 480 within the tracking data acquisition unit 105 to capture the new status of the counts within the decoders 450, 355, and 460 (see FIG. 15 et seq.).

The inertial platform 415 (FIG. 2) is connected to a post 425 that is threaded at one end 430 such that the entire data acquisition unit 105 can be rigidly attached to the tripod mounting hardware of a standard camcorder 120.

In addition to the accelerometers and the gyroscopes there is a control circuit 470 (FIGS. 2, 3, and 15) mounted to the bottom of the inertial platform 415 (see FIG. 2). This microcontroller based circuit (Z-WORLD SMARTBLOCK Model SB-DEV-32) polls the quadrature decoders 450, 455, 460 and the analog to digital converter 465 in sequence. Referring to FIGS. 5 and 6, the respective data packets 500, 505, and 520 from each sensor and a frame identification pattern (530 or 550) are complied to form the tracking data frame 535 (or 540) as the first step 600 (FIG. 6) in the data flow through the spatially referenced video camera 100. In the next few steps, 605, 610, 615, and 620, the data frame resulting from the first step 600 is broken into 4-bit nibbles which are encased within message byte having a "1" start bit and three "0" stop bits, as in "1XXXX000" where "XXXX" is the 4 bits of data. The message bytes are then subjected to encoding (HARRIS Model HD-6409) . The control circuit transmits a continuous stream of the tracking data frames to a modulator circuit 475 that modulates the data on to an audio line level signal. The inertial platform 415, the circuitry 420, the gyroscopes 400, 410 and the accelerometers 435, 440, 445 are all contained within a case 107 (FIG. 1). The single output 110 from the case 107 produces an audio signal containing the encoded bit stream of acceleration and orientation data. The output of the tracking data acquisition control circuit 470 is thus recorded to video tape alongside the corresponding video data signal from the video camera 120.

The spatially referenced camera 100 can be configured and used with a laser rangefinder 485 (FIG. 2), such as an Acuity Research Inc. ACCURANGE Model 3000 or in addition to, the video camera 120. In this configuration, the instantaneous distance between the spatially referenced camera 100 and a pinpointed location on the surface of an object that is being recorded is also captured and stored as a binary numerical representation of distance along with tracking data from the other sensors. As shown in FIG. 4 at 540, range data derived from the rangefinder 485 is appended to the data frame and recorded to video tape alongside the corresponding video data signal from the video camera 120. (If the camera 120 is of an "autofocus" design, it may be possible to derive a range signal from the camera's autofocus mechanism.) The rangefinder 485 (FIG. 2) is rigidly mounted to the inertial platform 415 and generates a continuous serial data output signal containing two alternating values. The rangefinder 485 output signal RXA1 is directly input to the tracking data acquisition unit control circuit 470 as a serial data signal. The first value contained in the signal output by the rangefinder 485 is a 24 bit numerical representation of the distance between the precise spot on the surface of the object being recorded and the spatially reterenced camera 100. The second value is an 8 bit gray scale value that indicates the reflectivity of the object's surface at the measured location. In this configuration, the control circuit 470 is configured to be interrupted by a signal from the quadrature decoders 450, 455, & 460 whenever there is a change in the inertial platform's orientation detected by the gyroscopes 400 and 410. Upon detecting an interrupt signal, the control circuit reads the range and reflectivity values presented serially by the rangefinder 485. In this alternative configuration, a range data packet 520 (FIG. 4) is compiled along with the accelerometer data packets 500 and the gyroscope data packets 505 to form the tracking data frame with range data as included at 540 in FIG. 4.

Referring to FIG. 4, the tracking data frame format 535 output by the tracking data acquisition unit 105 is essentially comprised of two or three different kinds of packets: acceleration packets 500, gyroscopic packets 505 and optionally, range packets 510. An acceleration packet 500 is a 24 bit value that represents the magnitude of an acceleration vector in the X, Y or Z direction. A gyroscopic packet 505 is a 16 bit value that represents degree of pitch, roll or yaw. A range packet 520 is a 24 bit value plus an eight bit value. The 24 bit value 510 represents a range distance and the eight bit number 515 represents relative surface reflectivity in terms of a gray scale value.

The format of a complete data frame 535 (without range information) is composed of a frame identification pattern 530, which is formed from three repetitions of the 16 bit value 017F hex (at 525). This is followed by data: a 24-bit acceleration value in the X direction 500A, a 16-bit pitch value 505A, a 24-bit acceleration value in the y direction 500B, a 16-bit roll value 505B, a 24-bit acceleration value in the Z direction 500C, and a 16-bit yaw value 505C. The tracking data frame format with range information included 540 starts with a frame identification pattern 550 composed of three repetitions of the value 037F hex (at 545), followed by a 24-bit acceleration value in the X direction 500A, an 8-bit delta (or incremental change) pitch value 505A, a 24-bit acceleration value in the Y direction 500B, an 8-bit delta roll value 505B, a 24-bit acceleration value in the Z direction SOOC, an 8-bit delta yaw value 505C, and finally the range data 555 and a gray scale reflectivity value 560. The records 540 containing range information are generated whenever an interrupt from the decoders 450, 455, and 460 indicates that the camera orientation has changed.

Once the video tape is filled with modulated tracking and video data, it is played back. The video output is directly connected to a conventional video digitizer input 180, such as the INTEL SMART VIDEO RECORDER, that is inserted into the ISA, EISA, VESA, or other accessory port or slot of the personal computer 185. As the video cassette 210 is played back on the video cassette player 205, the video digitizer interface 181 captures the video frames of the recorded images and passes digitized video frame data on to the tracking and video data entry and storage program 305 shown in FIG. 7.

The audio output of the video cassette recorder 135 is fed into a demodulator circuit 155 which converts the modulated tracking data signal back into a serial bit-stream of tracking data. The demodulation output 165 is connected to a conventional serial data input port 175 of the personal computer 185. As the video cassette 210 is played back on the video cassette recorder 130 or 205, the demodulation circuit 155 converts the modulated tracking data signal into an RS-232 serial data signal which is read into the personal computer 185 by the tracking and video data entry and storage program 305 through the serial port 175.

FIG. 7 shows the tracking and video data entry and storage program 305 data flow diagram. The modulated tracking data signal 145 from the audio output 135 or 220 of the video cassette recorder 130 or 205 is fed into the demodulator 155, where the audio signal is demodulated into a serial bit stream (step 640). The output of this process flows into a Manchester decoder (step 645). Every other nibble following an initial leading one of the decoded bit stream is then serially transmitted by the demodulator circuit 155 to the personal computer's serial port 175 (step 650). In the next step 655, the personal computer receives the bit stream and encodes each nibble as a ASCII hex digit 655. The ASCII digits are then assembled into lines of tracking data 660.

Simultaneously, the video signal 150 from the video output 140 or 215 of the video cassette recorder 130 or 205 is captured (step 680), and video frames are selected (step 685). Frame numbers are assigned to the selected video frames (step 690), and at step 665 these frame numbers are concatenated to the lines of tracking data to form tracking data lines. Finally, at step 675 a database of numbered tracking data lines is created and is stored on the disk in a database file called the tracking database 324.

At step 695, the video frame is fed into a video compression program, and the outputted compressed video frame is concatenated or otherwise linked to the same video frame number at 695. Finally, at step 700, a database of numbered and compressed video frames is created and is stored on the disk in a file that is called the video database 323.

The tracking and video data entry and storage program 305, residing on the personal computer 185, essentially builds two related databases. The first is a tracking database 324 composed of enumerated records containing the orientation, the translational acceleration, and optionally the range data originally generated by the tracking data acquisition unit 105. The second is a video database 323 composed of enumerated records containing digitized and compressed images of video frames captured from the video tape originally generated by the video camera 120.

Once all of the recorded tracking and video data are stored, the personal computer 185 converts the tracking database 324 into a positional database 322 via a software module called the tracking database to positional database conversion program 310 (FIG. 5).

In the preferred embodiment, as illustrated by the programs set forth in the appendix, an existing image capture computer program is adapted for use to capture, compress, and store selected images in the video database 323, as indicated in steps 680, 685, 690, 695, and 700 of FIG. 7. This is a conventional program for video capture that can capture and store a video image every ¹⁄₁₀th or ¹⁄₂₀th of a second or so (whatever the human user of the system specifies). This program is also capable of linking to and calling as a subroutine a separate program which performs the steps 655, 660, 665, 670, and 675 in FIG. 7 every ¹⁄₁₀th or ¹⁄₂₀th of a second, passing to this separate program the index value into the video database 323 that can later be used to find and retrieve the most recently captured image. This index value is stored in the tracking database 324 along with the associated tracking data extracted from the signal 170.

To implement the step 655, the computer 185 is equipped with a conventional, serial port interrupt driven program that is called upon automatically, whenever the serial input port 176 receives a serial byte of the tracking data signal 170, to retrieve the byte from the serial port UART and to store the byte in some form of circular buffer in RAM from which the bytes may be readily retrieved.

Each time the step 660 is performed (every ¹⁄₁₀th or ¹⁄₂₀th of a second or so), all the bytes currently in this circular buffer are retrieved, combined with historical data, and separated from any partial data frame that is retained as historical data. In this manner, several data frames in the format illustrated at 535 or 540 in FIG. 4 are retrieved from the circular buffer, combined with the current video data base 310 image retrieval index, and stored in the tracking database 324 (FIG. 5). Note that even though not all of the video image frames are normally retained, every piece of tracking data information must be retained so that the position and orientation of the inertial platform can be computed by a "dead reckoning" process. Accordingly, the same video image number is typically combined with several sets of tracking data information.

FIG. 5 illustrates the creation of the positional database. Numbered tracking data frames from the tracking database 324 are input to the program 310 which, using well known principles of Newtonian mechanics, converts the tracking data lines into positional data records. The positional data records are stored to the disk in a database file called the positional database 322. The format of the positional data records is dependent upon the method of conversion used in the conversion program 310. As shown in FIG. 9, there are two possible formats for the equivalent positional data. The quaternion position notation record format is composed of position number 720, video frame number 730, X displacement from the origin 735, Y displacement from the origin 740, Z displacement from the origin 745, and a unit vector defined by an X component 755, a Y component 760, a Z component 770 and a twist component 750. This data completely defines the position and orientation of the spatially referenced video camera 100 with respect to the point of origin. The other equivalent format is the direct angular notation representation. It is composed of the position number 720, video frame number 730, X displacement from the origin 735, Y displacement from the origin 740, Z displacement from the origin 745, and angular coordinates Rx 780, Ry 785 and Rz 790. These numeric values are separated by space characters 745, as shown. The details of the tracking database to positional database conversion programs 310 are shown in FIGS. 10 to 14, and a detailed program listing of the program is presented in Appendix B.

In the description presented below for the program 310, references are made to specific files in Appendix B, and to specific subroutines within those files.

References to the files will be set forth in square brackets, with the file name followed by the line number within the file. The files are set forth in alphabetical order by file name in Appendix B.

Figure 10:
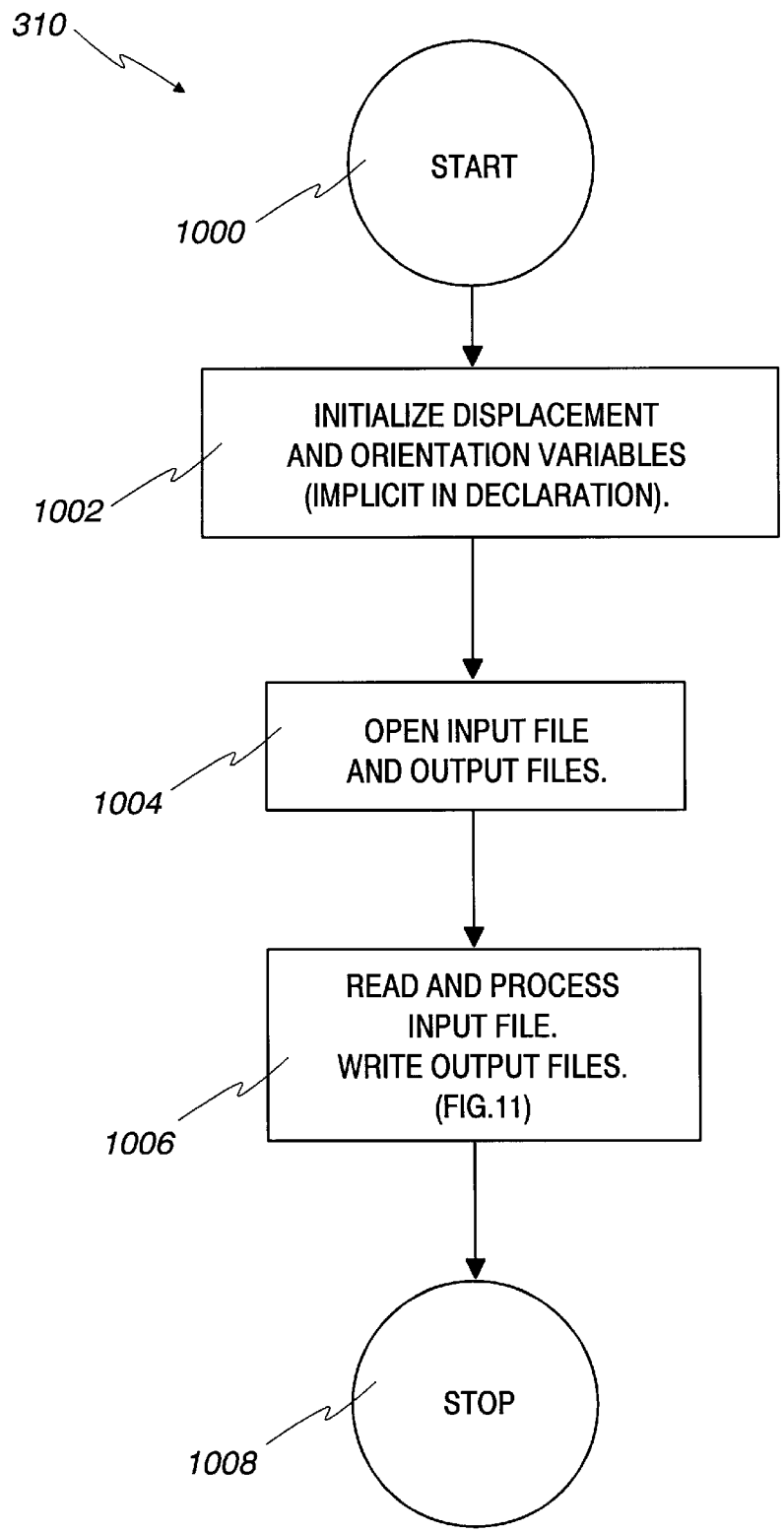
FIG. 10 is an overview block diagram of the tracking database to positional database conversion program 705.

With reference to FIG. 10, the program 310 begins at 1002 by initializing the variables. Then at 1004, it opens the input tracking data file 324 (FIG. 5), the output position file 322 (FIG. 5), and an alterative output position file (not shown - this alternative file has the orientation represented in quaternion form, rather than as yaw, pitch, and roll values). [App. B, mainqt.c, lines 19 et seq.] At 1006, the data is retrieved, processed, and placed in the output file. The data processing steps 1006 are described in FIG. 11 and are carried out by a program named RanToQuaternion [App. B, Accelqt.c, lines 207 et. seq.]

The program steps 1006 control the reading of the input file and enforce the formatting of the output file. In particular, these steps buffer the position records in such a manner that each record processed is complete even though the input records may have been broken up, as described above. In this manner, the program generates one and only one output position record for each frame.

The program begins at 1110 by reading in a data frame. At 1114, if there are no more frames, then at 1130 the files are closed and we are done. If a frame is found, a data record is retrieved from the frame at 1112. At 1118, if a record is found, it is processed at 1120 and written out to the positional database 322 at step 1122. Whether or not a record is found, program control continues at step 1124 where any unprocessed residual data is prepared (or added to) the next frame. Program control then returns to 1110 where the next frame is read.

Figure 12:
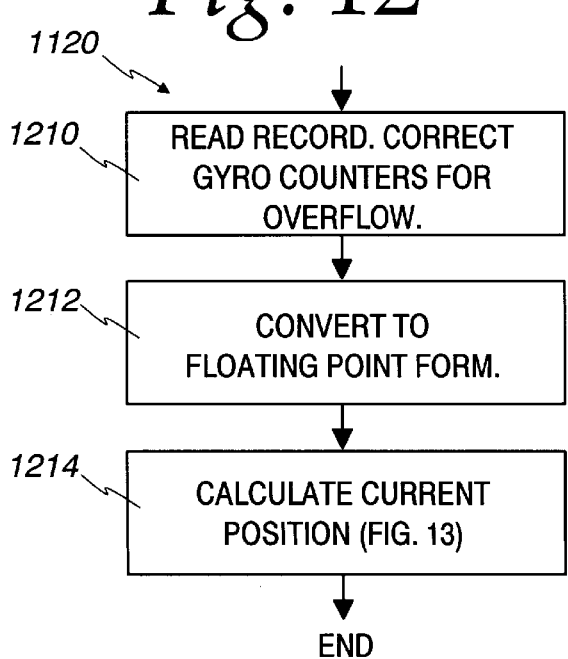
FIG. 12 is a more detailed block diagram of the step 1120 in FIG. 11.

The data record processing routine 1120 is described in FIG. 12. First at 1210, a record is read and is corrected for gyro counter overflow. Since the pitch, roll, and yaw numbers are 16-bit numbers that increase continuously if the camera rotates, they will occasionally overflow to zero. These numbers are thus converted into a 32 bit numeric format that never overflows. These steps are carried out by ProcessArcRecls [AECELQT.C, line 134].

Next, the acceleration values are converted into a floating point form at step 1212. Gain and offset errors can be corrected in this step. The program is ArcelToPosition [ACC2POS.C, line 276]. This routine also computes the magnitude of the acceleration as the square root of the sum of the squares of the three components.

Figure 13:
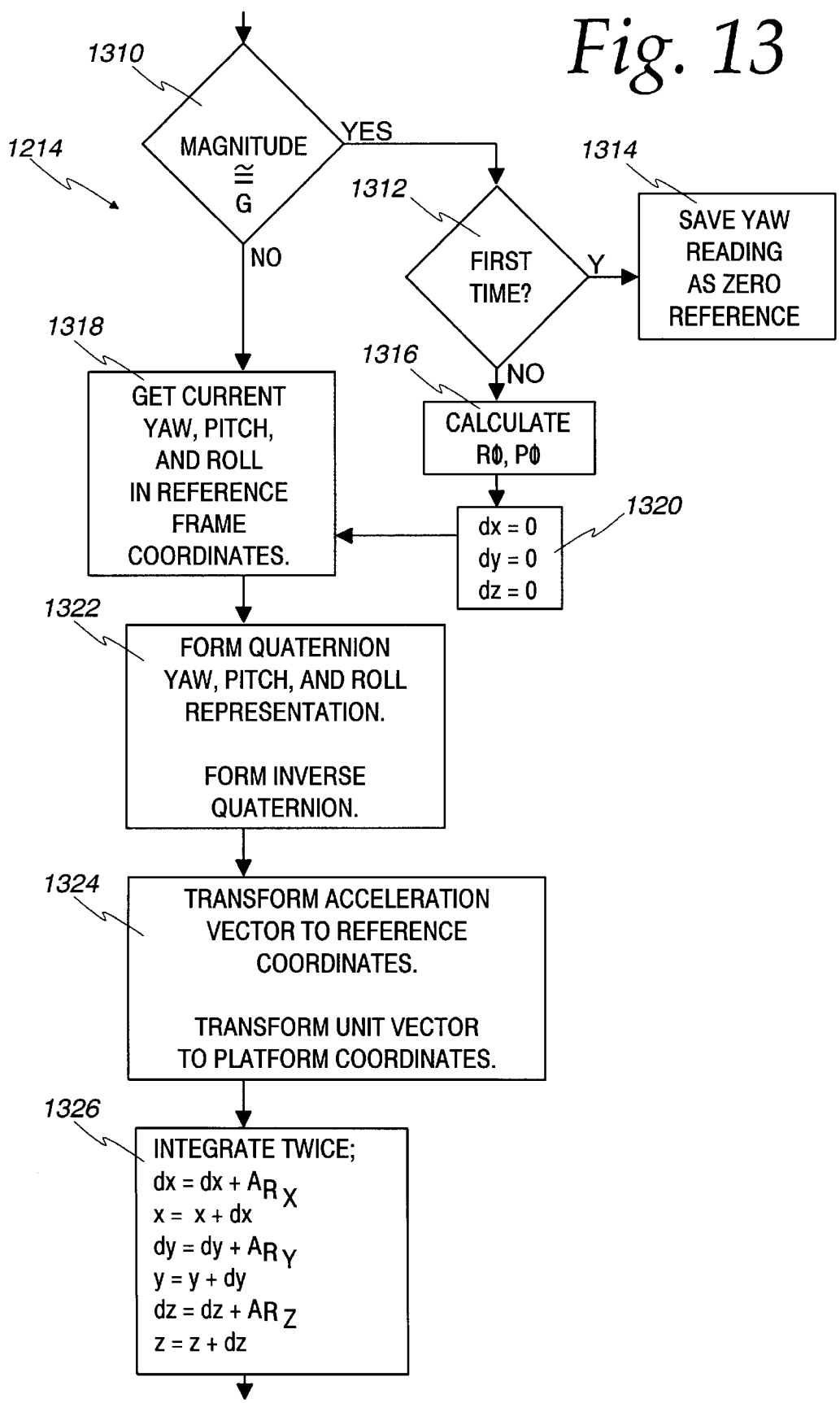
FIG. 13 is a more detailed block diagram of the calculate current position step 1214 in FIG. 12.

Step 1214 calculates the current position from the acceleration data. With reference to FIG. 13, first we test the magnitude to see if it is close to the gravitational constant (step 1310). If so, and if this is the first time that this condition has been met (step 1312), then the current yaw reading is saved as the zero directional reference for the data. In any case, at 1316, the gravity acceleration vector is used as a vertical reference for the purpose of determining how tilted the camera platform is. Valves of pitch and roll, P0 and RV, are computed which, when applied to the camera's present pitch and roll, give a level reference platform. The program that performs this calculation is set forth below and also appears in the routine GetRollPitchZero () [ACC2POS.C, line 56].

In the following short program, the values of acceleration are "ac->p.f" for the y value of acceleration and "ac->p.l" for the X value of acceleration (the z value is not needed). This program computes P0 and R0, and it acquires the initial yaw value as W0.

```
// acqire reference for pitch and roll gyros. Used to
// correct for G later
void GetRollPitchZero (PositionAttitudeRecord * ac,
                       long double rnagnitude)
{
    long double xmag, ymag, numAvg;
    xmag=ac->p. f/magnitude;
    ymag=ac->p. l/magnitude;
    numAvg=GO; // for backward average of all samples
        // numAvg=1; // for no averaging
    rref = -asinl (ymag);
    pref = asinl (xmag);
    // average over all samples, equal weights for all
    p0 = ((p0 * (numAvg-1)) + (deg(pref)+ac->a.p))/numAvg;
    r0 = ((r0 * (numAvg-1)) + (deg(rref)+ac->a.r))/numAvg;
    if (GO == 1) // this one is the first
    {
        w0 = ac->a.w; // init to current yaw count
    }
}
```

Acquisition of r0 and p0 values allows the definition of a reference frame for integration in which the transformed X and Y acceleration components have no contribution from the gravitational force. X and Y in the reference frame are perpendicular to the direction of the gravity vector, while Z in the reference frame is parallel to the gravity vector.

GetRollPitchZero also averages P0 and R0 readings on all subsequent calls after the first call to achieve better and better estimates for these values.

At step 1320, since the only acceleration is that of gravity, we assume that the camera is motionless, and we arbitrarily set the velocity values in all three directions to zero. This assumption holds because the camera is hand-held and is never stable when the human carrier is in motion. If the camera were mounted upon some conveyance that can move very smoothly at a uniform velocity, then this assumption would not hold, and some additional data indicating the velocity of the camera would have to be recorded. In an airplane or automobile, for example, the speedometer reading or ground speed reading could be recorded to assume that this algorithm functions properly.

Next, at step 1318, the current pitch, yaw, and roll are transformed into coordinates that indicate these parameters relative to the newly-defined reference frame. This calculation is performed by the routine PositionCalc [acc2pos.C, lines 212 to 216]. This step 1318 is always performed regardless of whether the magnitude of the acceleration matches that of gravity.

To facilitate, the following computations, the yaw, pitch, and roll values, which are presently referenced to a horizontal plane, must be converted into what is called the quaternion form. This is a four dimensional vector with three imaginary components and one real component. This is done to facilitate the transformation of the acceleration values, which are presently referenced to the tilted camera plane, into valves referenced to the horizontal reference plane (just defined, preparatory to integrating the acceleration values to produce velocity and displacement values.

This calculation is performed by the following program. In this program, the input variable is a record "AttitudeRecord" which contains yaw "w", pitch "p", and roll "r". The returned quaternion values are "s", "i", "j"", and "k", where "s" is the real value and the others are the imaginary values.

```
// convert yaw,pitch,roll to quaternion form
void AttitudeQuaternion   (AttitudeRecord * p,
                          QuaternionRecord * qcos)
{
    long double cw,cp,cr,sw,sp,sr; /* sine and cosine */
    long double rp, rw, rr;
    long double trace, c[3][3];
    rw=rad(p->w);
    rp=rad(p->p);
    rr=rad(p->r);
    cw=cosl (rw);
    cp=cosl (rp);
    cr=cosl (rr);
    sw=sinl (rw);
    sp=sinl (rp);
    sr=sinl (rr);
// use cosine matrix form for calculation
    c[0][0]=cw*cp; c[0][1]=sw*cp; c[0][2]=-sp;
    c[1][0]=(-cr*sw) + (sr*sp*cw); c[1][1]=(cr*cw) * (sr*sp*sw);
        c[1][2]=sr*cp;
    c[2][0]=(sr*sw) + (cr*sp*cw); c[2][1] = (-sr*cw)+(cr*sp*sw);
        c[2][2]=cr*cp;
    trace=c[0][0] + c[1][1] + c[2][2]
    qcos->s=sqrtl(1+trace) /2.;
    qcos->i=(c[1][2] - c[2][1])/(4.* qcos->s);
```

-continued

```
    qcos->j=(c[2][0] - c[0][2])/(4.* qcos->s);
    qcos->k=(c[0][1] - c[1][0])/(4.* qcos->s);
```

At step 1324, the acceleration vector is transformed from the camera body coordinate frame into the stable reference frame.

```
// rotate accel vector to platform coordinates
// using inverse quaternion
posqInverse.q.s=posqFwd.q.s;
posqInverse.q.i=-posqFwd.q.i;
posqInverse.q.j=-posqFwd.q.j;
posqInverse.q.k=-posqFwd.q.k;
QuaternionRotate (&pos->p, &posqInverse.q, &prec);
```

In the above, the acceleration vector is represented by a three component vector "&pos->pl". The four element quaternion value (computed above) is "posqFnd.q.s", "-.i", "-.j", and "-.k". In the above routine, this quaternion value is first inverted, giving "posqInverse.q.s.", etc. Next, this inverted quaternion and the acceleration vector are passed to the "QuaternionRotate" routine which returns the transformed acceleration values in a vector "&prec".

At step 1326, the integration of the transformed acceleration values is carried out as follows:

dx+=(prec.l)/G;

dz+=(prec.u)/G;

dy+=(prec.f)/G;

x+=dx;

y+=dy;

z+=dz.

In the above routine, "dx", "dy", and "dz", are the velocity values in the x, y, and z directions. "x", "y", and "z" are the distance values. The incoming acceleration values are "prec.1" for the "x" axis acceleration, "prec.f" for the "y" axis acceleration, and "prec.u" for the "z" axis acceleration. Note that the acceleration values are normalized with respect to the value of gravity.

The quaternion coordinate transformation process is carried out by using two cross multiplications, and is illustrated below:

```
//returns rotated vector in rp
void QuaternionRotate    (postionRecord *v,
                         QuaternionRecord *q,
                         PositionRecord *rp)
{
    QuaternionRecord vq,qi,rq;
    // quaternion multiplication qi v q
    // from the book.
    // qi is -i -j -k . . .
    vq.s=0; vq.i=v->f; vq.j=v->1; vq.k=v->u;
    qi.s=q->s;
    qi.i=-q->i;
    qi.j=-q->j;
    qi.k=-q->k;
    QuaternionMultiply (&qi, &vq, &rq);
    QuaternionMultiply (&rq, q, &vq); //reissue vq
    rp->f=vq.i;
    rp->l=vq.j;
    rp->u=vq.k.
```

The incoming arguments to this function are a three-dimensional vector "v" that is to be rotated and a four-dimensional quaternion vector "q" that defines the rotation. The three-dimensional vector "v" is first transformed into a four-dimensional vector "vq" with the fourth component "vq.s" set to zero.

First, an inverse "qi" is formed of the quaternion "q". Next, the incoming vector "vq" is quaternion multiplied by the inverse quaternion vector "qi;". The result of this multiplication "rq" is then quaternion multiplied by the quaternion vector "qi". Three components of the resulting vector, which is returned as "vq", are transferred back into the vector "rp" which is returned as the transformed result.

The quaternion multiplication is defined by the following program:

```
void QuaternionMultiply (QuaternionRecord *q,
                         QuaternionRecord *s,
                         QuaternionRecord *r)
{
    r->s=(q->s*s->s)-(q->i*s->i)-(q->j*s->j)-(q->k*s->k);
    r->i=(q->s*s->i)+(q->i*s->s)+(q->j*s->k)-(q->k*s->j);
    r->j=(q->s*s->j)-(q->i*s->k)+(q->j*s->s)+(q->k*s->i);
    r->k=(q->s*s->k)+(q->i*s->j)-(q->j*s->i)+(q->k*s->s).
}
```

Figure 11:
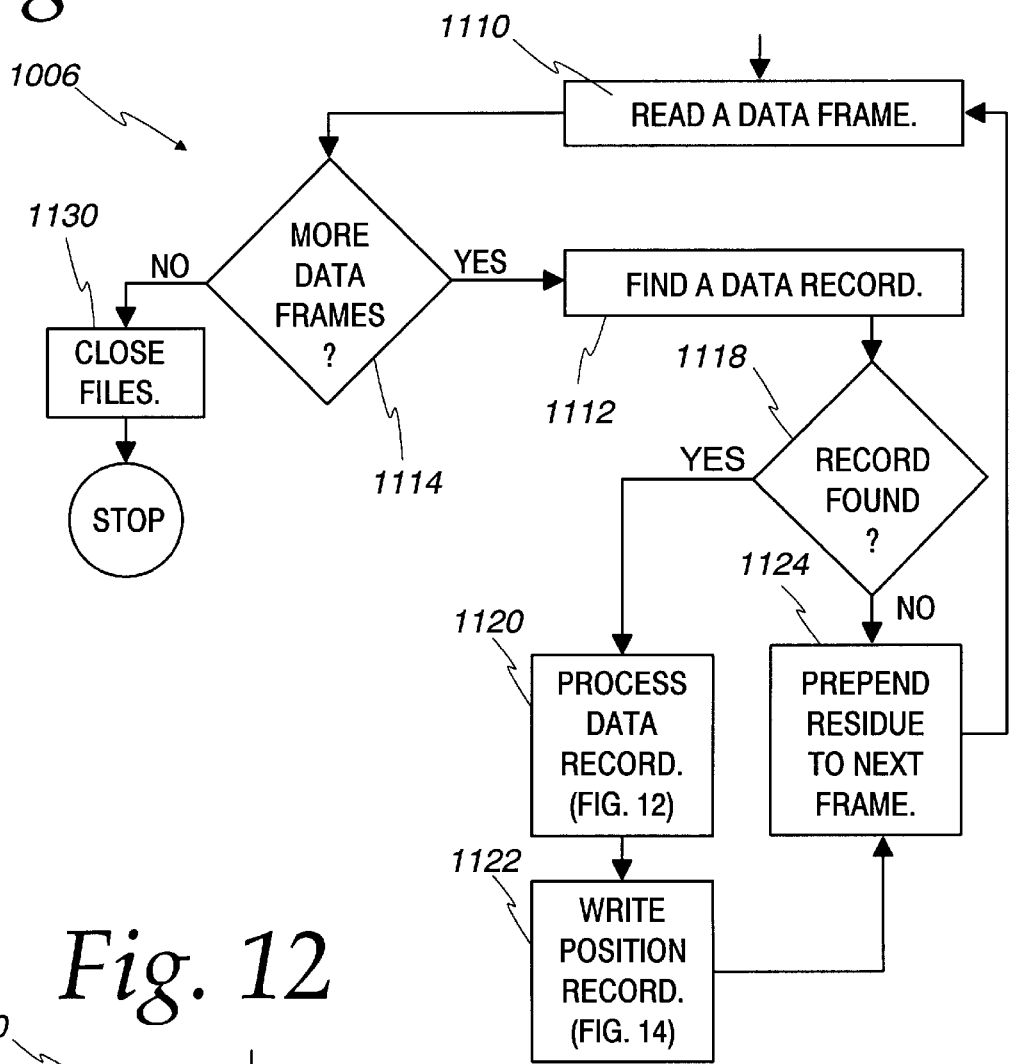
FIG. 11 is a more detailed block diagram of the step 10006 in FIG. 10.
Figure 14:
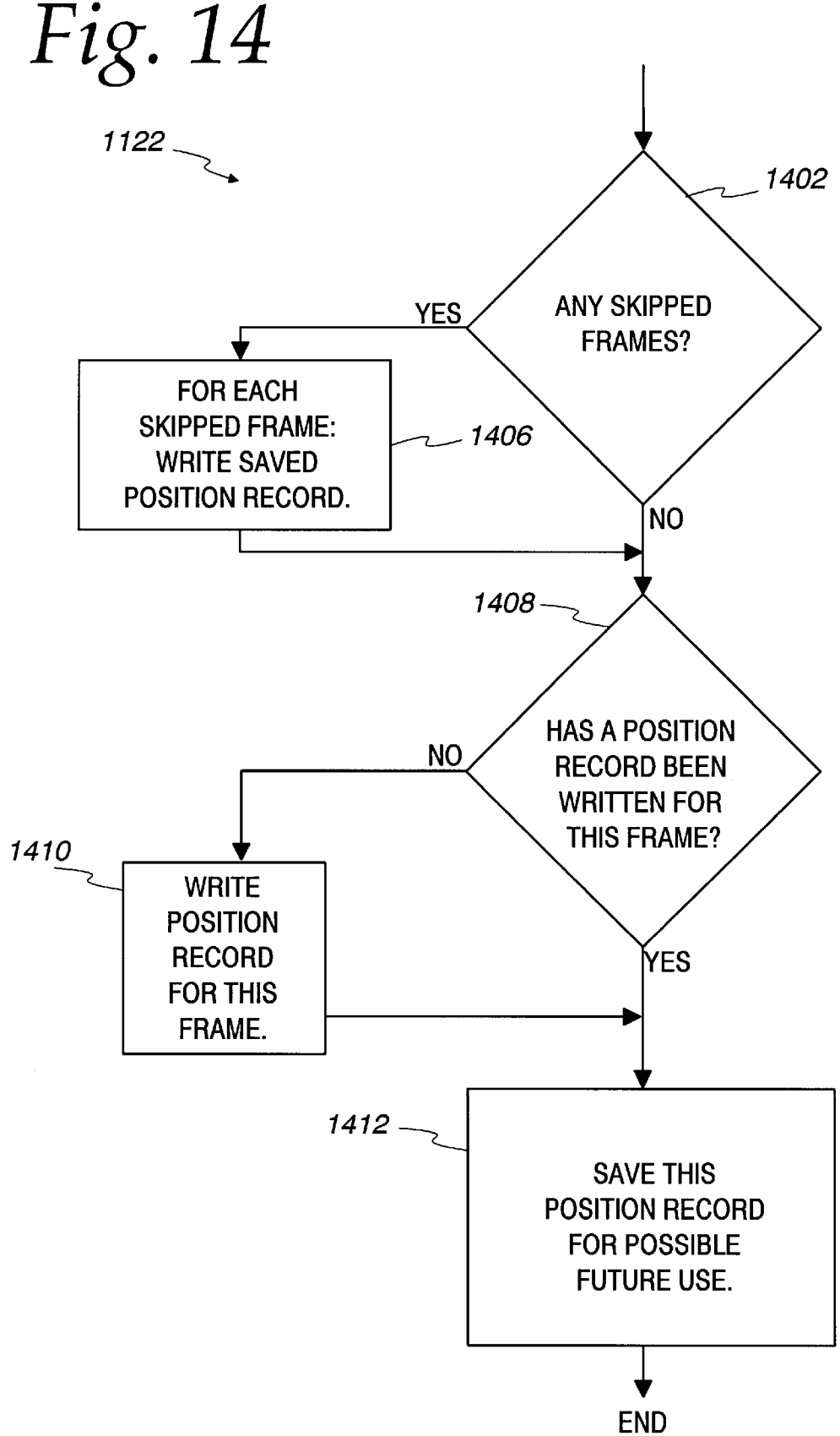
FIG. 14 is a more detailed block diagram of the write position record step 1122 in FIG. 11.

The details of the step 1122 in FIG. 11 relating to the writing out of a record 775 (FIG. 9) are set forth in FIG. 14. At step 1402, if any frame numbers were skipped, at step 1122 a position record is generated and saved for each such skipped frame. Since there are more acceleration records than there are video frames, step 1408 tests to see if the current frame number has already been written out as a position record. If not, then a new position record 775 is written out at step 1410 along with the frame number. In any case, at step 1412, the position record is saved for possible future use if any frames were skipped (at step 1402 during a future iteration).

In addition to writing out the records 775 (FIG. 9) into the positional database 322 having the file name extension "*.TLA", the preferred embodiment of the invention simultaneously writes out records of the type 715 (FIG. 9) into a separate positional database (not shown) having the file name extension "*.TEL". In this manner, two positional databases are created, one specifying camera attitude using the direct angular notation format, and the other specifying camera attitude using the quaternion notation format.

An alternative method of position estimation using the inertial platform is now described. The accelerometer inputs described above as the vector "pos" in the program "acc2pos.c" is replaced by a vector of constant velocity as shown in this program fragment:

```
if (magnitude < G + DELTA_MAG//+DELTA
    && magnitude > G - DELTA_MAG//-DELTA
    )
{
    // for velocity estimation method
    // dx = dy = dz = 0;
    pos->p.f=0;
}
else
{
    pos->p.f=500; // assume motion is in direction
        camera is pointing
}
pos->p.l=0; pos->p.u=0;
```

This sets the velocity vector to one of two values, depending upon the magnitude of instantaneous acceleration being experienced. The vector component "pos->p.f", is the component pointing in the direction of the camera.

If the magnitude is below the threshold G + or − DELTA_MAG (the force of gravity plus or minus a small deviation, determined by empirical measurement), the camera is assumed to be at rest. If the magnitude is outside this range the velocity is set to be the average velocity of a person walking. The camera is pointed in the direction the operator is walking whenever the operator moves, and this velocity vector is transformed using the same quaternion as the acceleration measurement above.

The velocity vector is rotated in the following code fragment:

QuaternionRotate(&pos->p,&posqInverse.q,&prec);

The position is then calculated by summing each resultant component:

x-=prec.l;
    y+=prec.f;
    z+=prec.u;

The full text of the alternative "acc2pos.c" file is given in Appendix F. This file is to be substituted for the "acc2pos.c" file listed in Appendix B.

Figure 33:
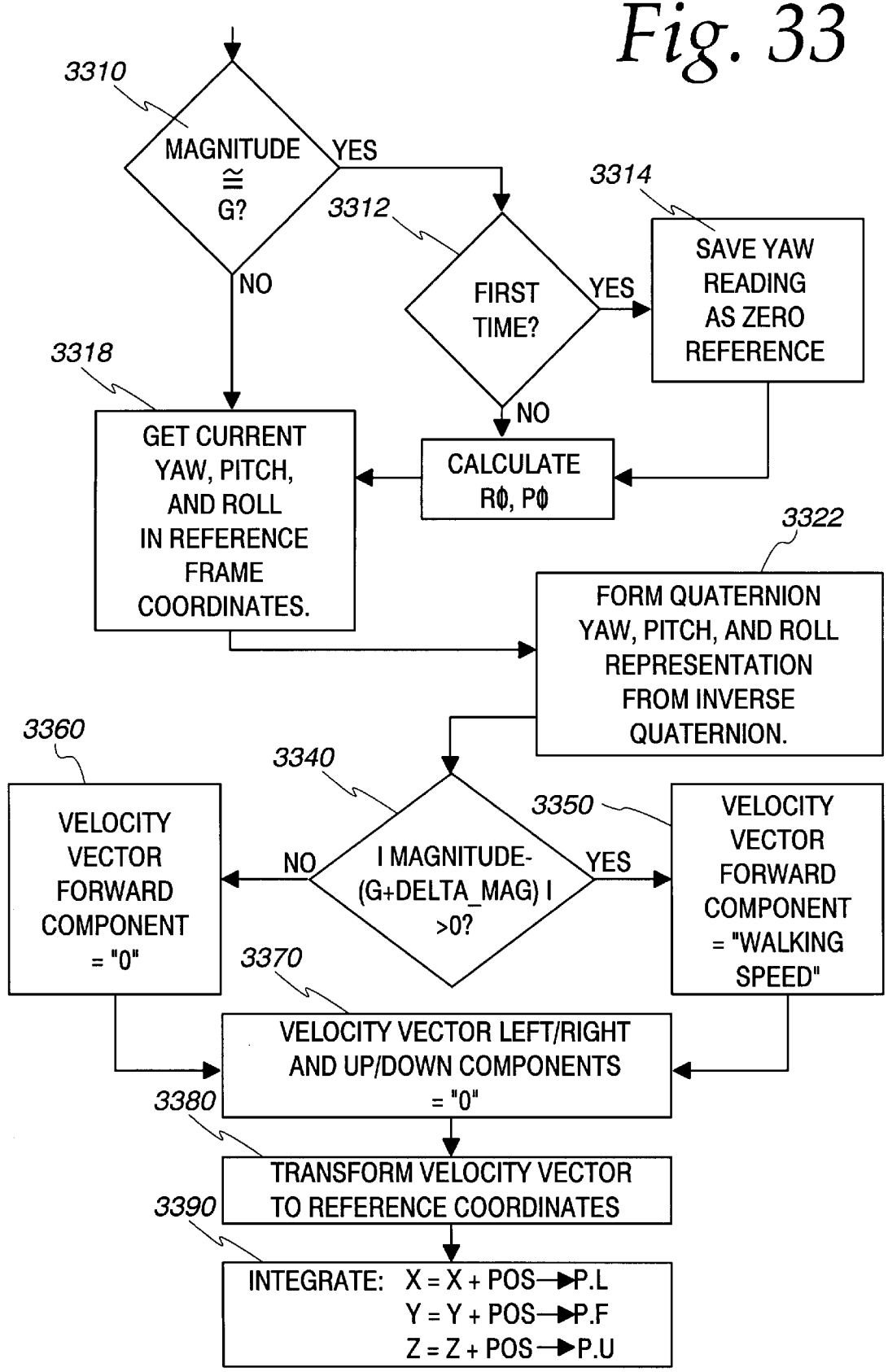
FIG. 33 is a block diagram of an alternative method for converting tracking data to position data.

FIG. 33 shows the flow diagram for the alternate position calculation method. FIG. 33 is to be substituted for FIG. 13 in the program flow described above. In particular, the box in FIG. 13 labeled 1324 is replaced by a box 3380, and the box labeled 1326 is replaced by a box 3390.

In FIG. 33 box 3340 the absolute value of acceleration magnitude is compared to that of gravity plus a constant value. If the absolute value of the difference of these quantities is greater than zero, movement is indicated. The forward velocity component pos->p.f is then set to a velocity value of "walking speed" in box 3350. Otherwise forward component is set to 0 in box 3360. In either case the left-right and up-down components are set to 0 in box 3370.

The velocity estimate is then transformed from platform coordinates to reference coordinates in box 3380. The resulting transformed velocity is summed component-wise to produce the position estimate in box 3390.

These boxes in FIG. 33 are identical to their counterparts in FIG. 13: FIG. 33 box 3310 is identical to FIG. 13 box 1310.

FIG. 33 box 3312 is identical to FIG. 13 box 1312.
FIG. 33 box 3314 is identical to FIG. 13 box 1314.
FIG. 33 box 3322 is identical to FIG. 13 box 1322.

Figure 15A:
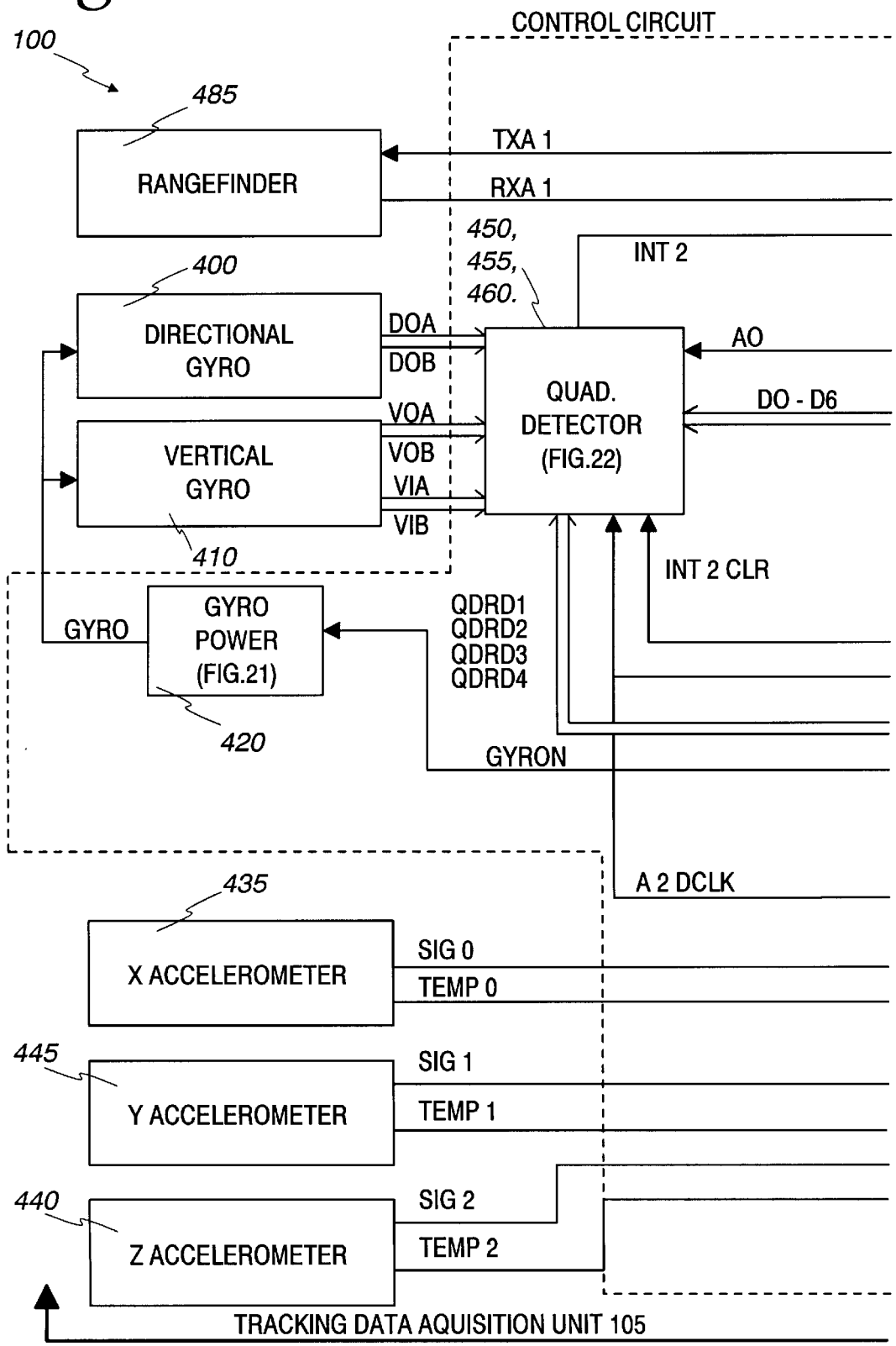
FIG. 15 (shown as FIG. 15a and 15b) is an overview block diagram of the tracking data acquisition unit control circuit 470 illustrating in particular its electrical interconnections to the remaining elements of the spatially referenced video camera 100.
Figure 15B:
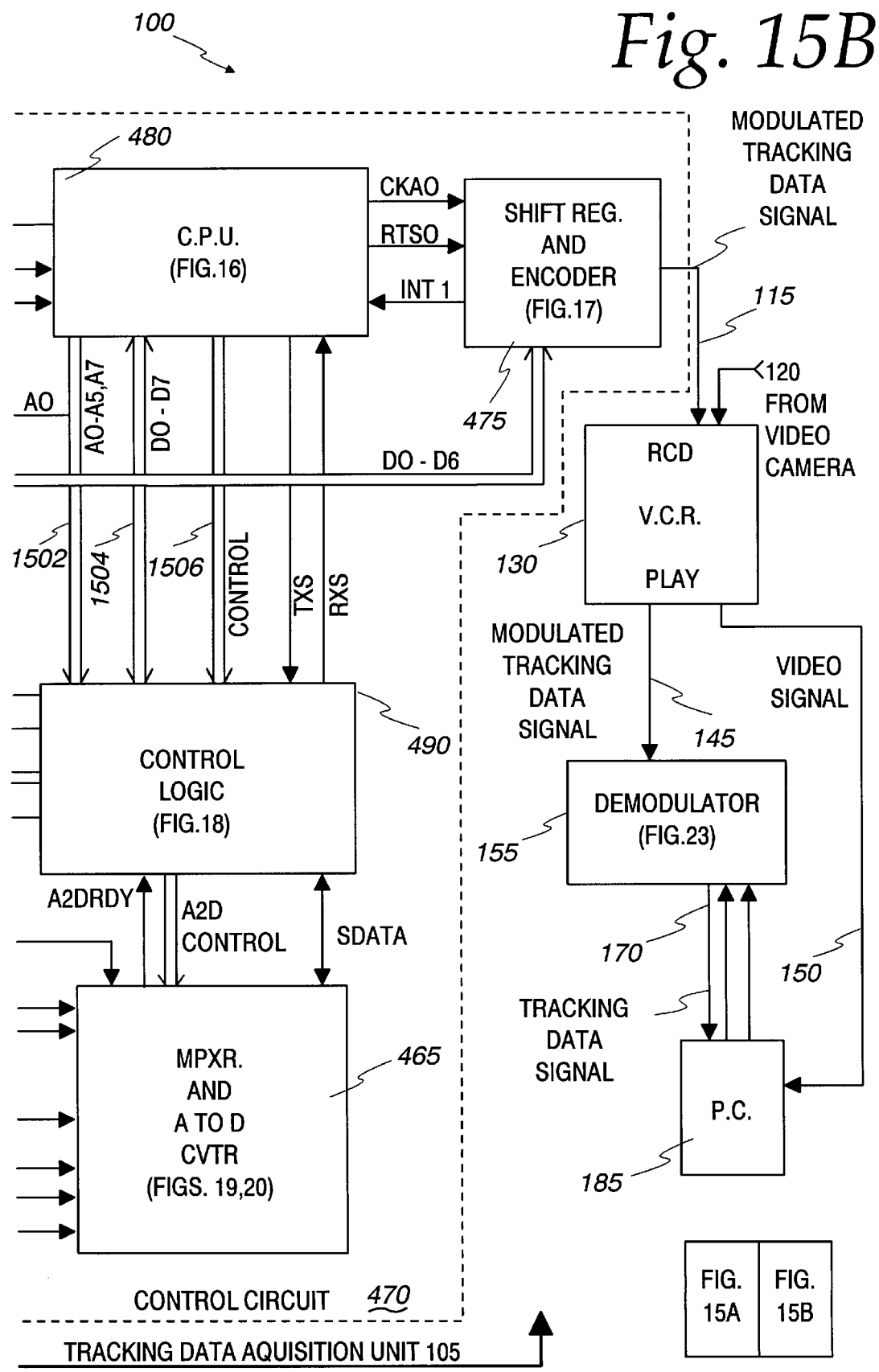
Figure 16:
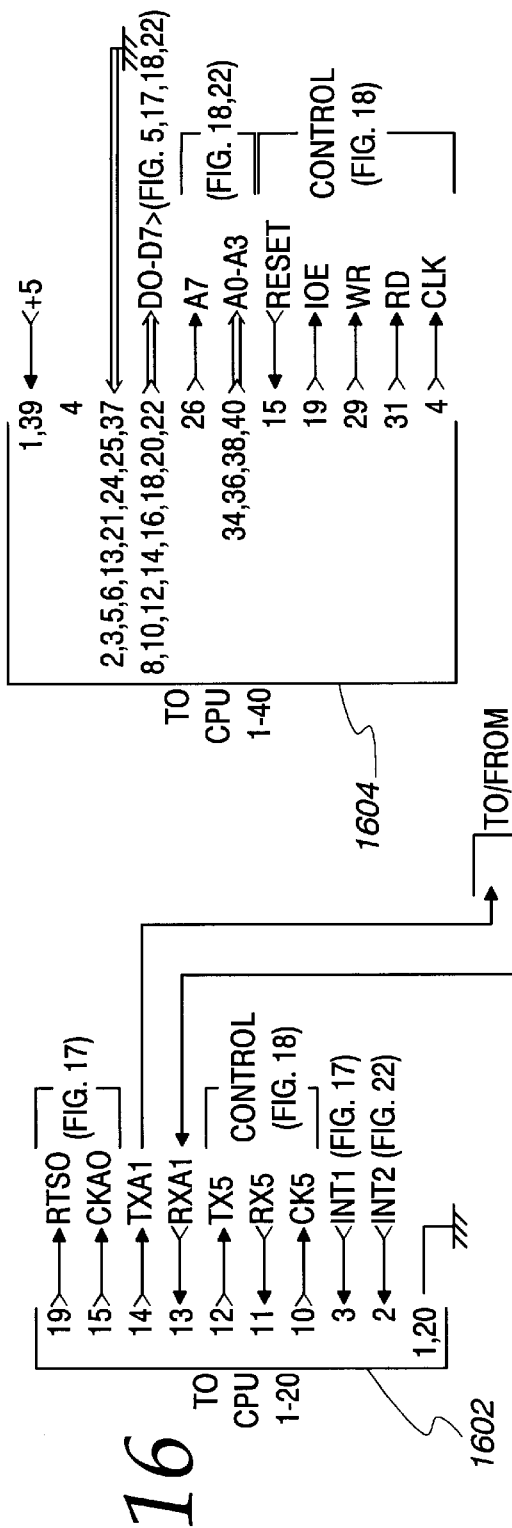
FIG. 16 is a block diagram of the connections to the microcontroller within the control circuit 470.

Referring now to FIG. 15, the hardwire circuitry portions of the invention are shown in overview block diagram form. Detail circuit diagrams of the circuits contained within the various circuit blocks shown in FIG. 15 are to be found in FIGS. 16–23 that follow. FIG. 15 sets forth all of the significant signal interconnections between the circuitry blocks. As shown in FIG. 15, the heart of the tracking data acquisition unit 105 is a control circuit 470 which contains a central processing unit 480. This central processing unit, in the preferred embodiment, is a Z-WORLD SMART BLOCK, Model SB-DEV-32, programmable computer. As shown in FIG. 16, the SMART BLOCK central processing unit interconnects to the control circuit 470 through two connectors, a 20 pin connector 1602 and a 40 pin connector 1604. FIG. 16 sets forth all of the interconnections between the central processing unit and the remaining portions of the tracking data acquisition unit 105, identifying by name all of the signals running to and from the central processing unit 480 and identifying by number the pins to which they connect.

Figure 18:
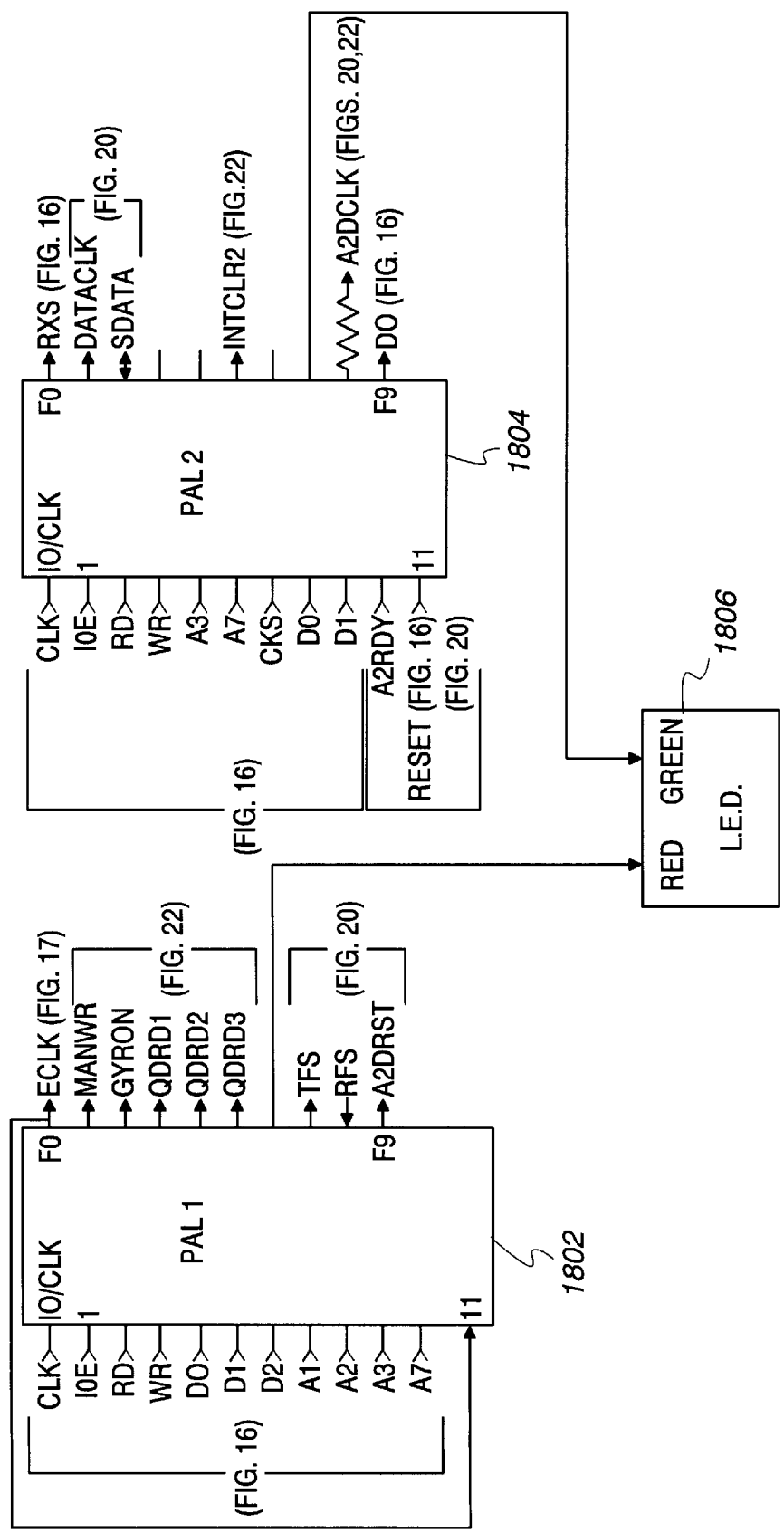
FIG. 18 is a schematic diagram of the control logic interface circuit connecting the microprocessor to the remaining components within the control circuit 470 and generating many of the control signals.

In FIG. 15, the central processing unit 480 provides addressing signals 1502, data signals 1504, and control signals 1506 to a control logic 490, the details of which are shown in FIG. 18. With reference to FIG. 18, the control logic 490 is seen to contain two programmable logic units PALS which respond to the signal from the CPU by generating all of the various control signals that are needed to run the tracking data acquisition unit 105. FIG. 18 identifies which signals emanate from which pins of the two PALS 1802 and 1804. The actual logic of the PALS is set forth in an appendix to this patent. FIG. 18 also reveals that a combined red and green light emitting diode array 1806 is interconnected to the two PALS as shown to provide selective red, yellow, and green pilot lamp illumination to signal the status of the tracking data acquisition unit 105.

Referring once again to FIG. 15, the rangefinder 485 is shown connected to the CPU 480 by means of two serial communication lines, an outgoing serial communication line TXA1 carrying commands from the CPU 480 to the rangefinder 485, and a return serial communication line RXA1 carrying serial information from the rangefinder 485 back to the CPU 480. The rangefinder 485 returns gathered information periodically, at its own rate of speed. The CPU 480 formulates a range packet 520 (FIG. 4) containing a 24 byte range value 510 and an 8 byte gray scale value 515, and adds it to the telemetry stream of data.

The two gyroscopes, the directional gyroscope 400 and the vertical gyroscope 410, are designed so that when they are deprived of power, they return to rest positions with the vertical gyroscope 410 having its axis vertically disposed and with the directional gyroscope 400 having axis horizontally disposed.

Figure 21:
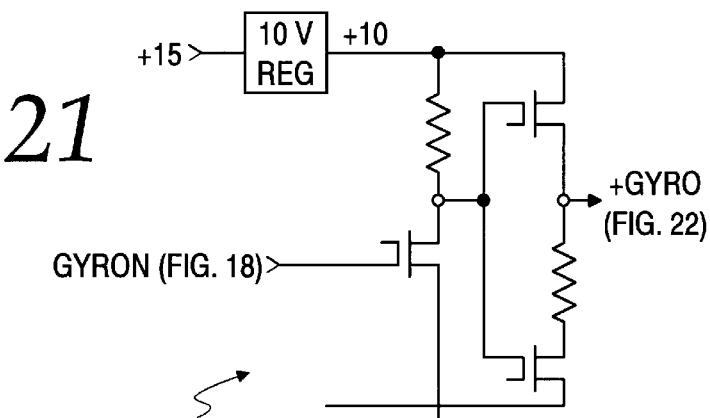
FIG. 21 is a schematic diagram of the voltage regulator and power switch for the gyroscopes.

When the camera 100 is placed into operation, the central processing unit 480 causes the control logic 490 to generate a GYRON signal and to feed it to a gyroscope regulated power supply 420, the details of which are shown in FIG. 21. In response, the gyroscope power supply 420 generates a plus 10 volt, regulated +GYRO signal which feeds power to both of the gyroscopes 400 and 410. In response, the gyroscope motors begin to spin so their axis are stabilized and so that the gimbals associated with the gyroscopes begin to generate pairs of quadrature modulated signals indicating the rotational motions of the tracking data acquisition unit 105.

The directional gyroscope 400 generates two square wave signals in quadrature as the platform 1215 is rotated about a vertical axis to the left or to the right. These quadrature signals, which may be called collectively the yaw signal, appear on the two wires D0A and D0B. These signals arise from sensors associated with the gimbals within the gyroscope 400 in response to rotation of the gimbals.

The vertical gyroscope 410 is similarly equipped with two sets of sensors associated with its gimbals to generate pitch and roll quadrature modulated signals. The pitch signal, which appears on the two wires ViA and V1B, indicates the rate at which the camera 120 is pointing more upwards towards the ceiling or more downwards towards the floor. The roll, signal which appears on two wires V0A and V0B, indicates the rate at which the camera is tilting to one side or to the other, away from or towards the vertical.

These quadrature modulated pairs of signals require brief explanation. Assume for the moment that the camera is being rotated horizontally from left to right. This will cause a yaw signal to appear on the two wires DOA and DOB. Each wire bears a square wave signal, and the square waves are at quadrature with each other. This means that a negative going transition of the first of the square wave signals is followed by a negative going transition of the second of the square wave signals. Likewise, a positive going transition of the first signal is always followed by a positive going transition of the second signal. The speed of these transitions indicates the speed with which the camera is being rotated from left to right. If the camera motion stops, then the signals remain stationary until camera motion proceeds once again. If the direction of rotation is reversed, then again square wave signals are generated—but this time in the opposite phase of quadrature. Thus, if a left-to-right motion causes a first signal to make its transitions ahead of the second signal, then a right-to-left motion will cause the second signal to make its transitions ahead of the first signal. This is identical to the way in which the motion signals work in a mouse pointing device of the type commonly used with digital computers.

The pitch and roll signals, represented respectively by the V1A–V1B and by the V0A–V0B signal lines, operate in a manner identical to the yaw signal just described, with the information being conveyed by quadrature modulated square waves.

Figure 22:
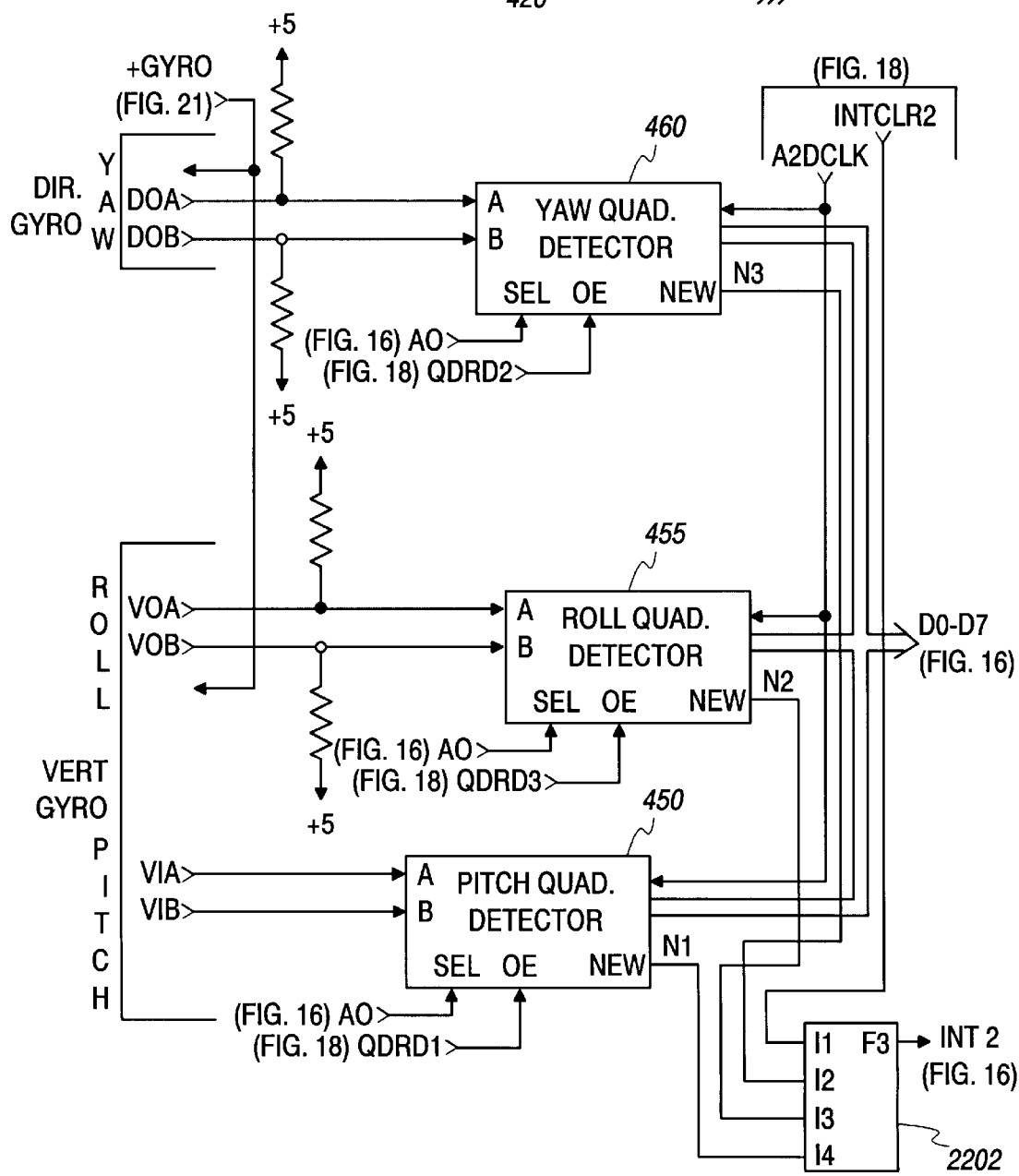
FIG. 22 is a schematic diagram of the gyroscopes and their associated quadrature decoders within the control circuit 470.

With reference to FIG. 22, the three pairs of quadrature modulated signals V1A, V1B, V0A, V0B, and D0A, D1B are fed into respective quadrature decoders 450, 455 and 460. The quadrature decoders 450, 455 and 460 are conventional models, in this case Hewlett Packard Model No. HCTL 2020. Briefly described, whenever one of the quadrature decoder 450, 455 or 460 senses a fluctuation of one of the incoming signals, the quadrature decoder counts the fluctuations and either adds a count to or subtracts a count from a count valve that is maintained within the decoder. The decoder may then generate an interrupt signal over a signal line N1, N2 or N3 which causes an interrupt controller 2202 to generate an INT 2 interrupt signal which is fed back to the central processing unit 480 in FIG. 15 to signal that there has been a change in the roll, pitch, or yaw. In response, the CPU 480 then polls the quadrature decoders 450, 455 and 460 by means of QDRD1, QDRD2, and QDRD3 signals in conjunction with the A0 address lead. This arrangement permits the central processing unit to select any of several registers within the quadrature decoder by presenting the number of the desired register on the data leads D0 to D7 with A0 low and by then reading the contents of the selected register, or adjusting its contents, with A0 high. In this manner, the CPU 480 may initialize and then later monitor the operation of the quadrature decoders. The clocking signal A2DCLK for the quadrature decoders 450, 455 and 460 is generated by the PAL 1804. This same clocking signal is also used to supply clocking timing pulses to the A-to-D converter 2002 in FIG. 20.

Figure 19:
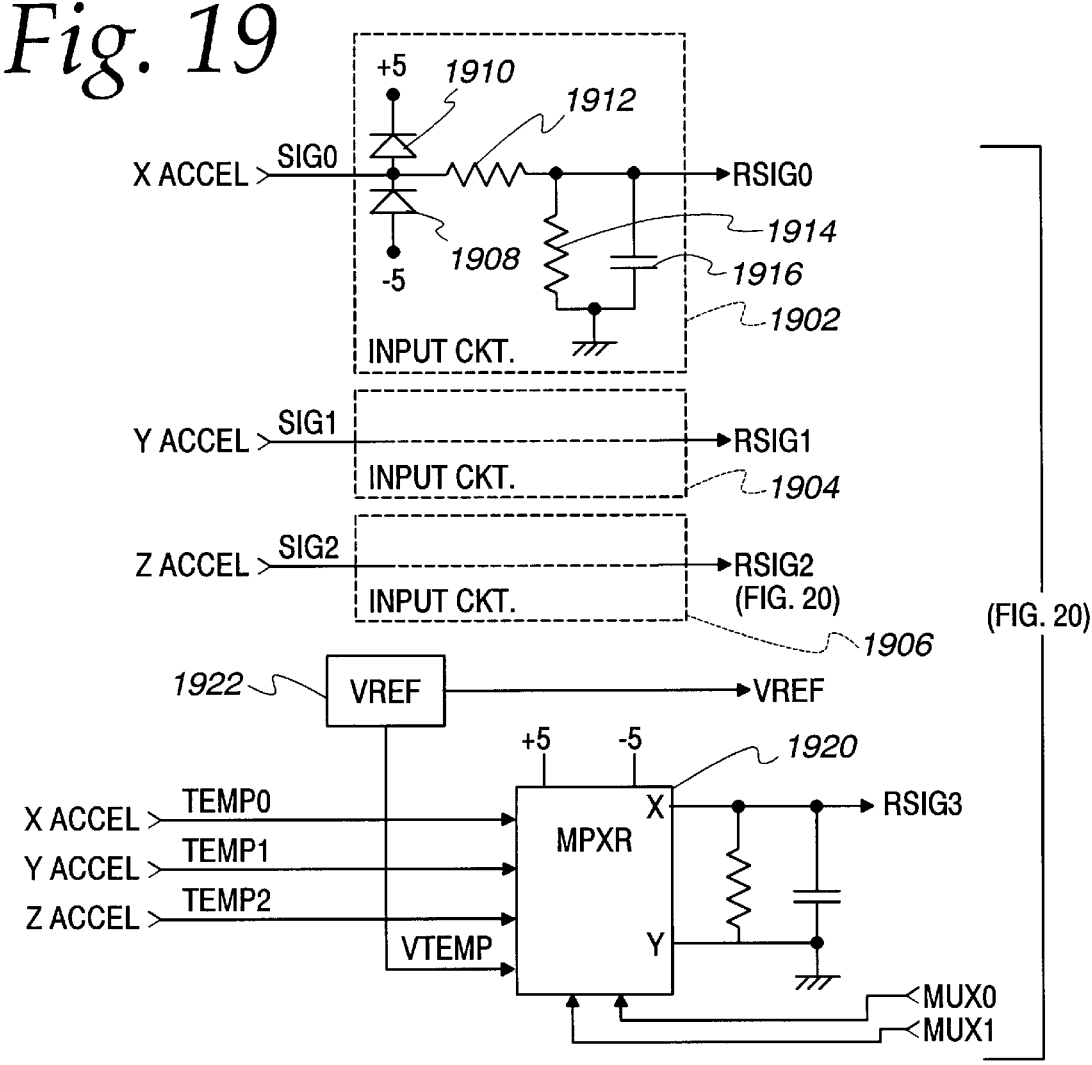
FIG. 19 is a schematic diagram of the interface between the accelerometers and the analog to digital converter within the control circuit 470.
Figure 20:
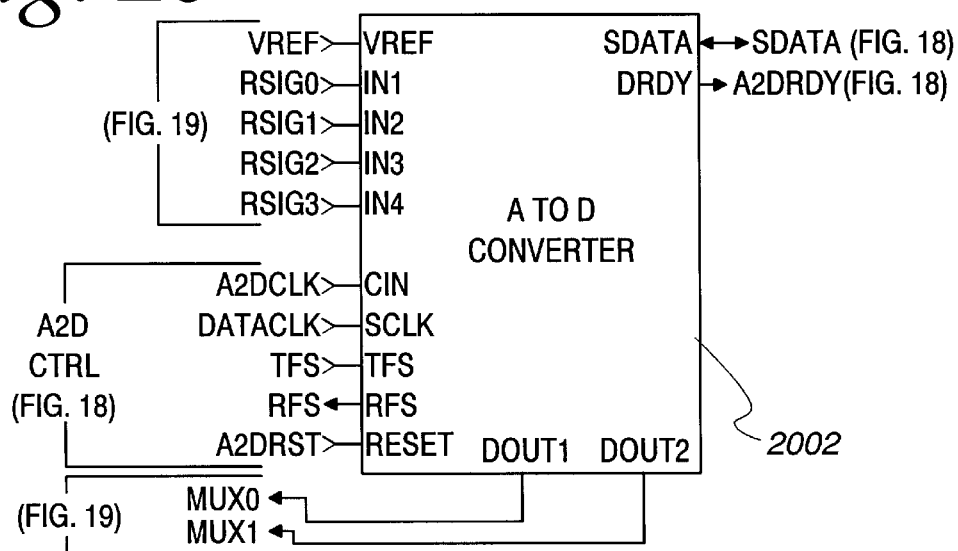
FIG. 20 is a schematic diagram of the analog to digital converter within the control circuit 470.

Referring once again to FIG. 15, the three accelerometers 435, 440, and 445 are shown each generating an analog accelerometer output signal SIGO, SIG1, and SIG2 and also a temperature signal TEMPO, TEMP1, and TEMP2. These signals flow into the multiplexer and A-to-D converter 465 which is depicted in FIGS. 19 and 20. Referring first to FIG. 19, it will be seen that the three accelerometer signals, SIGO, SIG1, and SIG2 are initially passed through a filtering and smoothing input circuit 1902, 1904, 1906, which includes clamping diodes 1908 and 1910 connected respectively to plus and minus 5 volt supplies and a resistor divider circuit 1912 and 1914, and a smoothing capacitor 1916.

The output of these input circuits 1902, 1904, and 1906 are labeled respectively RSIG0, RSIG1, and RSIG2, and these signals flow directly into the inputs of the analog to digital converter 2002 shown in FIG. 20. The temperature signals TEMP0, TEMP1, TEMP2 flow directly into a multiplexer 1920 which is controlled by a pair of signals MUX0 and MUX1 which flow directly out of the outputs of the A-to-D converter 2002, such that the A-to-D converter 2002 (FIG. 20) is in control of the multiplexer 1920 (FIG. 19). The multiplexer 1920 receives the three signals TEMP0, TEMP1, TEMP2, and also a fourth signal VTEMP which flows from a reference voltage source VREF 1922. The multiplexer 1920 selects one of these four signals to present as a signal RSIG3, which flows into the fourth input of the A-to-D converter 2002 shown in FIG. 20. The voltage VTEMP flowing from the source VREF source 1922 also flows into a reference voltage input VREF of the A-to-D converter 2002 in FIG. 20.

The A-to-D converter 2002, shown in FIG. 20, is an analog device model AD7716. It is connected to the control logic 419 in FIG. 18 by a bidirectional serial communications line SDATA over which commands can flow from the CPU 480 to the A-to-D converter 2002 and over which data can flow from the A-to-D converter 2002 back to the CPU 480. More particularly, and with reference to FIG. 18, a serial transmission data line TXS flows from the CPU 480 into the PAL 1804 which can be routed out over the SDATA signal line to the A-to-D converter 2002 shown in FIG. 20. Information returned by the A-to-D converter 2002 flows over the SDATA signal line to the PAL 1804 and out over an RXS serial transmission line back to the central processing unit 480. In this manner, the A-to-D converter 2002 may be programmed by the CPU 480 to perform its data gathering tasks, and the digitized measurements of the incoming analog signals may be returned to the central processing unit 480.

As shown in FIG. 20, a number of A-to-D control signals flow from the control logic FIG. 18 to the A-to-D converter 2002. These include the previously mentioned A2DCLK signal, the serial data clocking signal DATACLOCK, a TFS signal, an RFS signal, and a reset signal A2DRST. In addition, when the A-to-D converter has data ready to present to the CPU 480, it generates an A2DRDY signal which is accepted by the PAL 1804 shown in FIG. 18.

In operation, the A-to-D converter 2202 is programmed to compare the three incoming signals from the accelerometers RSIG0, RSIG1, and RSIG2 to the reference voltage signal VREF, to digitize the values of the accelerometer signals, and to return them serially as a 24-byte acceleration vector magnitude value through to the central processing unit 480. Optionally, and in addition, the A-to-D converter 2002 may be used to compare the temperature signals TEMP0, TEMP1, TEMP2 from the accelerometers 435, 440 and 445 to the reference voltage temperature VTEMP by means of the multiplexer 1920 (FIG. 19) which can route any of these four signals into the fourth input of the A-to-D converter so that the A-to-D converter can sense changes in the temperature of the accelerometers and can supply temperature information to the CPU 480 to allow it to compensate for any temperature fluctuations (in the Preferred Embodiment of the Invention, this temperature compensation has not been implemented as a working feature, although the hardware is set up so that it may be done so by software reprogramming).

In the manner described above, the central processing unit 480 is enabled to obtain data indicating the distance of the subject from the rangefinder 485; it is enabled to obtain pitch, roll, and yaw data values from the vertical and directional gyroscopes 400 and 410; and it is enabled to obtain data defining the instantaneous acceleration of the tracking data acquisition unit 105 from the accelerometers 435, 440 and 445 in all three coordinate directions. The CPU 480 continuously packages this information, as explained in steps 600 to 615 in FIG. 6, into the frame data format that is illustrated at 535 or 550 in FIG. 4. This frame data format information is presented in parallel, one byte at a time, over the data bus D0–D6 to shift register and encoder 475, the details of which appear in FIG. 17.

The shift register and encoder 475 converts the signal into a modulated serial tracking data signal which is presented over the audio data line 115 to the audio record input of the VCR 130.

Figure 17:
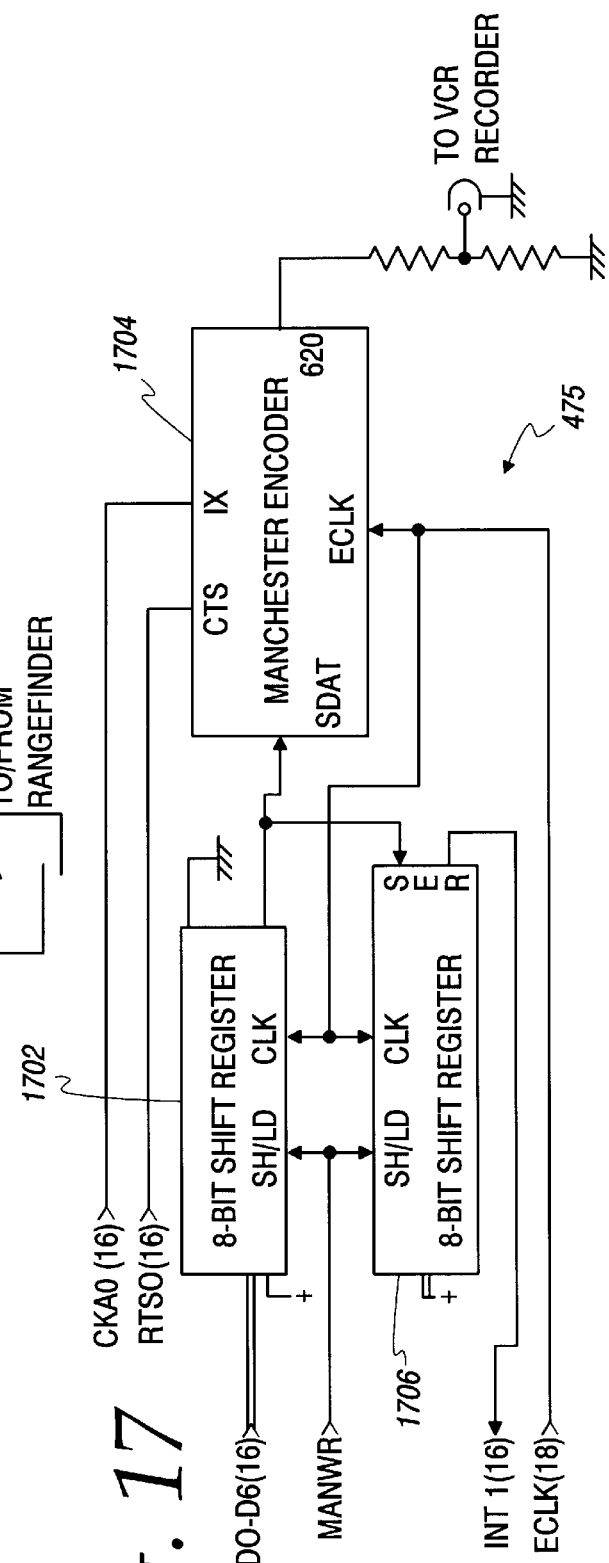
FIG. 17 is a schematic diagram of the data modulation and output circuit within the control circuit 470.

Referring now to FIG. 17, the parallel data presented by data leads D0–D6 is loaded into the parallel input of an eight bit shift register 1702 from which it is shifted out serially into a Manchester encoder 1704 which modulates the signal and presents it to the VCR recorder at 115 as shown. The serial signal is also fed into a second 8 bit shift register 1706 through which it flows such that when the start bit appears at the output of the of the shift register 1706, it appears as an INT1 interrupt signal which is fed back to interrupt the CPU 480 and to thereby advise the CPU 480 that an entire byte of information has been presented successfully to the audio line 115 and that the shift register and encoder 475 is ready for another byte of information. The control signals RTS0 and SKA0 also flow into and control the Manchester encoder 1704, and timing is provided by an ECLK signal generated by the PAL 1802 shown in FIG. 18.

To summarize the operation of the tracking data acquisition unit 105 as shown in FIG. 15, the central processing until retrieves from the rangefinder 485 in serial form an 8 bit gray scale value 515 and a 24 bit range value 510, as shown in 520 in FIG. 4. It retrieves from the quadrature decoders 450, 455, and 460 associated with the directional and vertical gyroscopes 400 and 410 16 bit data values representing the current pitch, roll, and yaw as stored within counters within the quadrature decoders 450, 455 and 460. It retrieves from the X, Y, and Z accelerometers 435, 445, and 440, 24-bit values representing the current instantaneous acceleration to which the tracking and data acquisition unit 105 is being subjected.

It then combines all of this information into a packet, with each byte in the packet containing a 11111 start bit, a nibble of data, and three trailing "0" stop bits, with a 3 byte header 530 and 550 such as those shown at 535 or 540 in FIG. 4. Each packet thus begins with the frame ID pattern elements shown at 525 or 545 as three bytes of information. This is followed by the X acceleration data 500A, the pitch data S0SA, the Y acceleration data 500B, the roll data 505B, the Z acceleration data 500C, the yaw data 505C, the range data 555, and the gray scale data 560, as shown in FIG. 4. This information is sent through to the shift register and encoder 475 and appears as a modulated tracking data signal on the audio line 115 which is then recorded by the VCR 130 along with the images flowing from the video camera 120.

Figure 23:
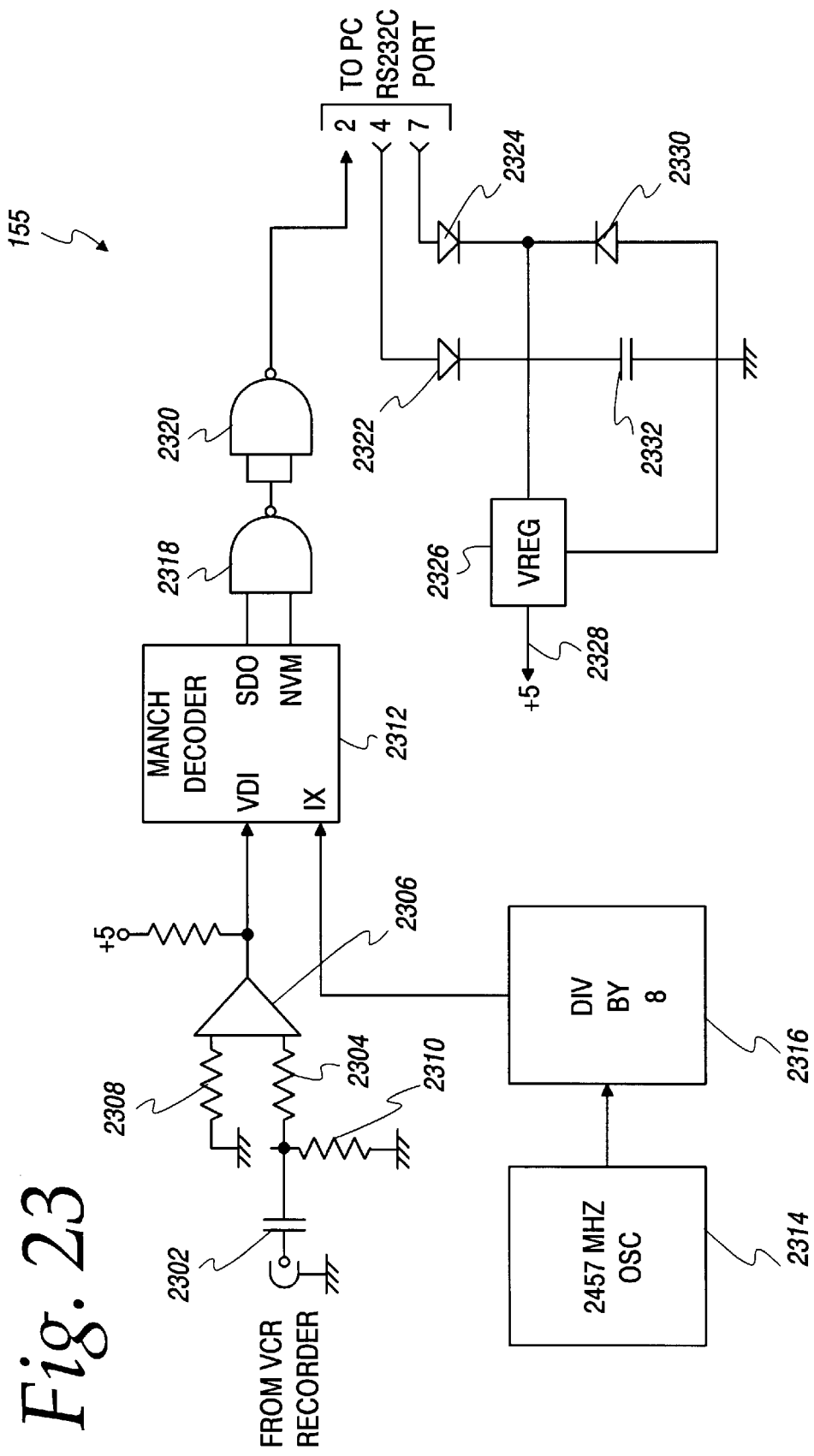
FIG. 23 is a schematic diagram of the demodulation circuit of the spatially referenced camera apparatus 100.

Upon playback, the video signal 150 flows directly into the personal computer 185. The modulated tracking data signal 145 flows to a demodulator 155, the details of which are shown in FIG. 23. Following demodulation, the unmodulated tracking data signal flows over a signal line 170 to the PC 185.

With reference to FIG. 23, the audio input from the VCR player flows through a capacitor 2302 and a resistor 2304 into the input of an operational amplifier 2306 having its other input strapped to ground by a resistor 2308. A second resistor 2310 straps the node joining the capacitor 2302 to the resistor 2304 to the ground potential. The output of the operational amplifier 2306 flows directly into a Manchester decoder circuit 2312, a unit identical to the Manchester encoder circuit 1704 shown in FIG. 17, but wired in accordance with the manufacturers' instructions to serve as a decoder rather than as an encoder. Clocking signals originate in a 2.457 mhz oscillator 2314 and are passed through the divide by eight counter 2316 before they flow into the Manchester decoder 2312. The ST0 and NVM outputs of the Manchester decoder are combined by an AND GATE 2318, and the resulting signal then flows an inverting gate 2320 and is applied to pin 2 of a standard computer RS232 C serial data connector over which the signal flows directly into a UART (not shown) within the serial input port 176 of the personal computer 185. The UART presents the data values in parallel to the computer software, which processes it as indicated beginning with step 655 in FIG. 7 and the steps that follow, as has been described. Power to operate the demodulator 155 is derived by means of diodes 2322 and 2324 having their anodes respectively coupled to pins 4 and 7 of the RS232 C port to derive power from the PC 185 when those pins are at a high voltage level, and with their cathodes connected to the input of a regulated power supply VREG 2326, at the output 2328 of which appears +5 volts.

For protection, the anode of the diodes 2322 and 2324 are coupled to the anode of a third diode 2330 which connects to ground and which is bypassed by a smoothing filter capacitor 2332 with sufficient charge capacity to regulate and stabilize the input voltage to the regulated power supply VREG 2326.

Figure 24:
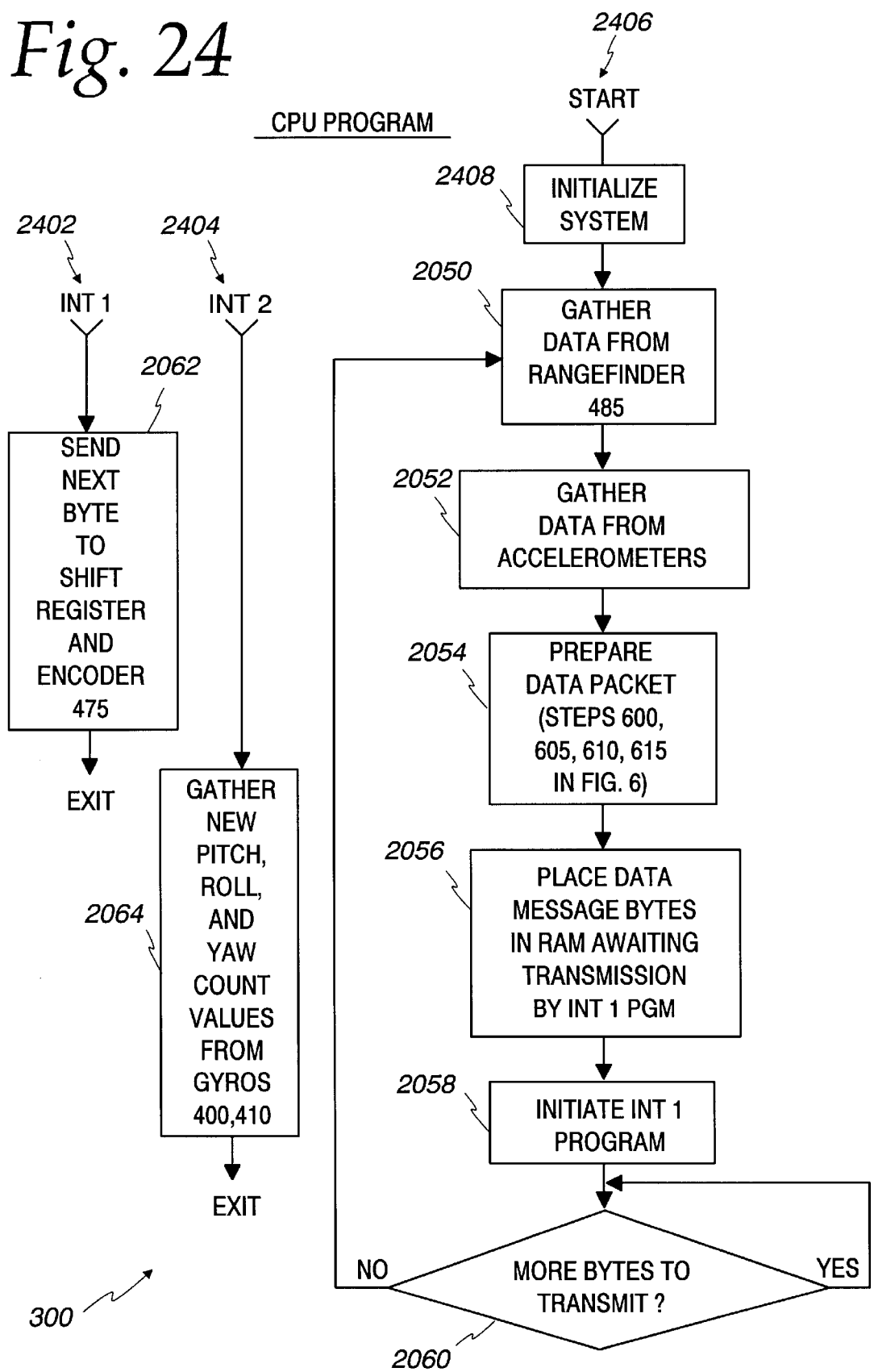
FIG. 24 is a block diagram of the programs which control the central processing unit 480 in FIG. 16.

FIG. 24 presents a block diagram view of the three programs that control the operation of the central processing unit 480 shown in FIG. 15. Two of these programs 2402 and 2404 are interrupt driven, and the third program 2406 either runs continuously, or it is called into operation periodically by a timer triggered interrupt or other similar mechanism.

The program 2406 begins at 2408 by initializing the system. Initialization includes such steps as turning on the power supply 420 for the gyroscopes, programming and initializing the three quadrature decoders 450, 455, and 460, and setting up the analog to digital converter 2002 in FIG. 20 (within the block 465 in FIG. 15).

Next, at 2050, data is gathered from the rangefinder 485. At 2052, the analog to digital converter 2002 is commanded to gather from the accelerometers 435, 445, and 440 the current acceleration of the tracking data acquisition unit 105.

At step 2054, the above data, together with previously stored values of yaw, roll, and pitch are combined into a data packet, with 4 bits of data per byte, as has been explained above (steps 600, 605, 610, and 615 in FIG. 6; and see the data formats presented in FIG. 4). At step 2056, the resulting data packet is placed into RAM memory as a series of bytes to await transmission to the shift register and encoder 475 (FIG. 17).

At step 2058, the interrupt driven program 2042 is placed into service to transmit the bytes of data to the shift register and encoder 475.

At step 2060, the program 2406 tests to see if all of the data bytes have been transmitted. Alternatively, the program simply suspends itself until a fixed time interval has expired. In either case, after transmission is completed or after the expiration of the time interval, program control recommences with step 2050.

The program 2406 thus continuously operates to assembled data packets and to transmit them to the shift register and encoder 475 where the data is modulated onto an audio signal suitable for recordation on the audio soundtrack of a VCR.

The program 2402 is an interrupt driven program placed into operation by the interrupt signal INT1 every time the shift register and encoder 475 successfully transmits a byte of information. At 2062, this program simply sends a data byte from RAM to the shift register and encoder 475 until there are no more data bytes that remain to be transmitted. This interrupt driven routine frees up the program 2406 from the time consuming task of continuously monitoring for when to transmit the next byte of data.

The program 2404 is also an interrupt driven program. It is placed into operation every time one of the three quadrature decoders receives a signal fluctuation from one of the gyroscopes. In response to INT2, this program gathers pitch, roll, and yaw values from the two gyroscopes and stores them in RAM for later transmission at step 2064.

A detailed program listing is set forth in appendix D. The present preferred embodiment of the invention utilizes a movie mapper program 325 (FIGS. 25–32) to assist the user in retrieving and displaying the images.

Figure 28:
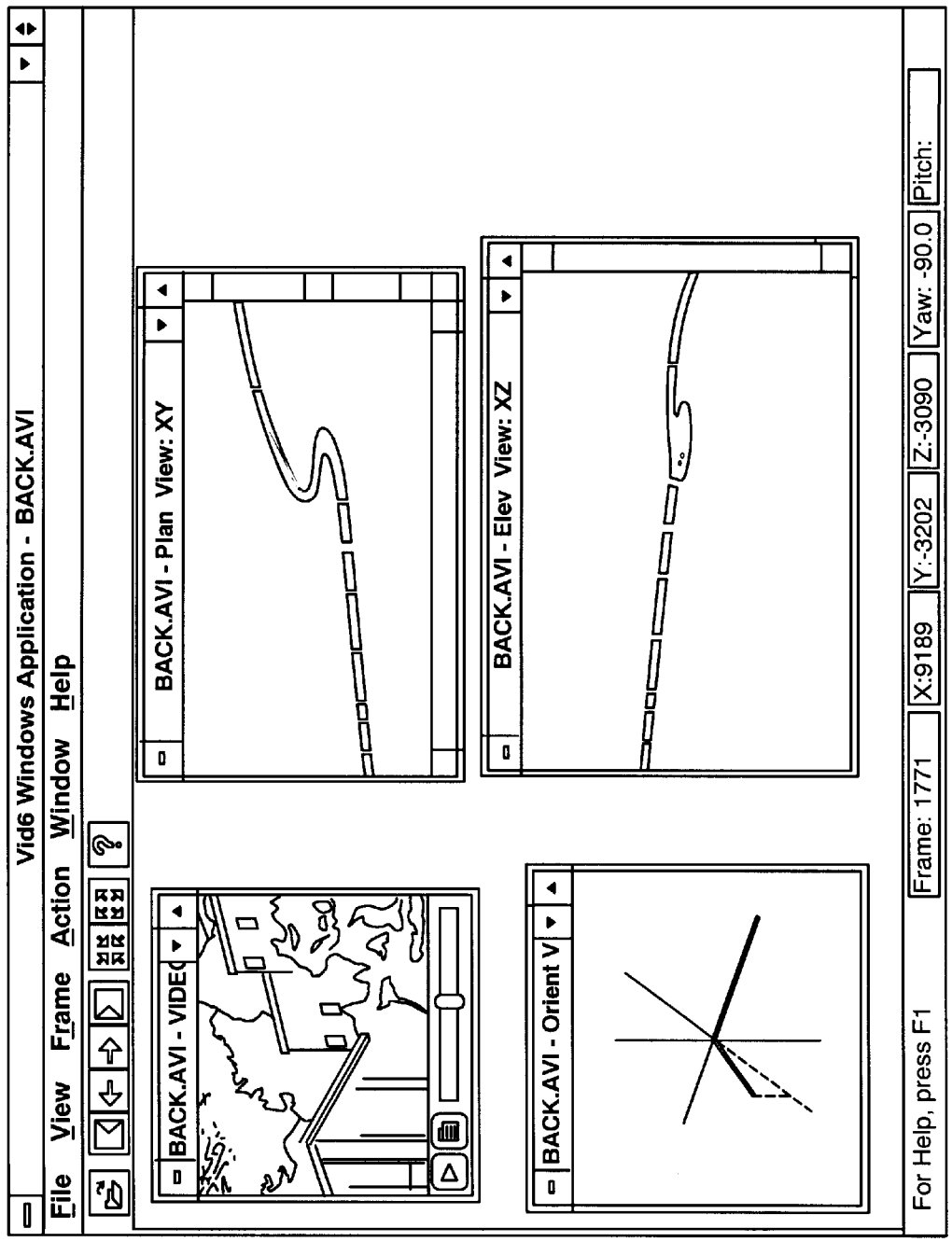
Figure 29:
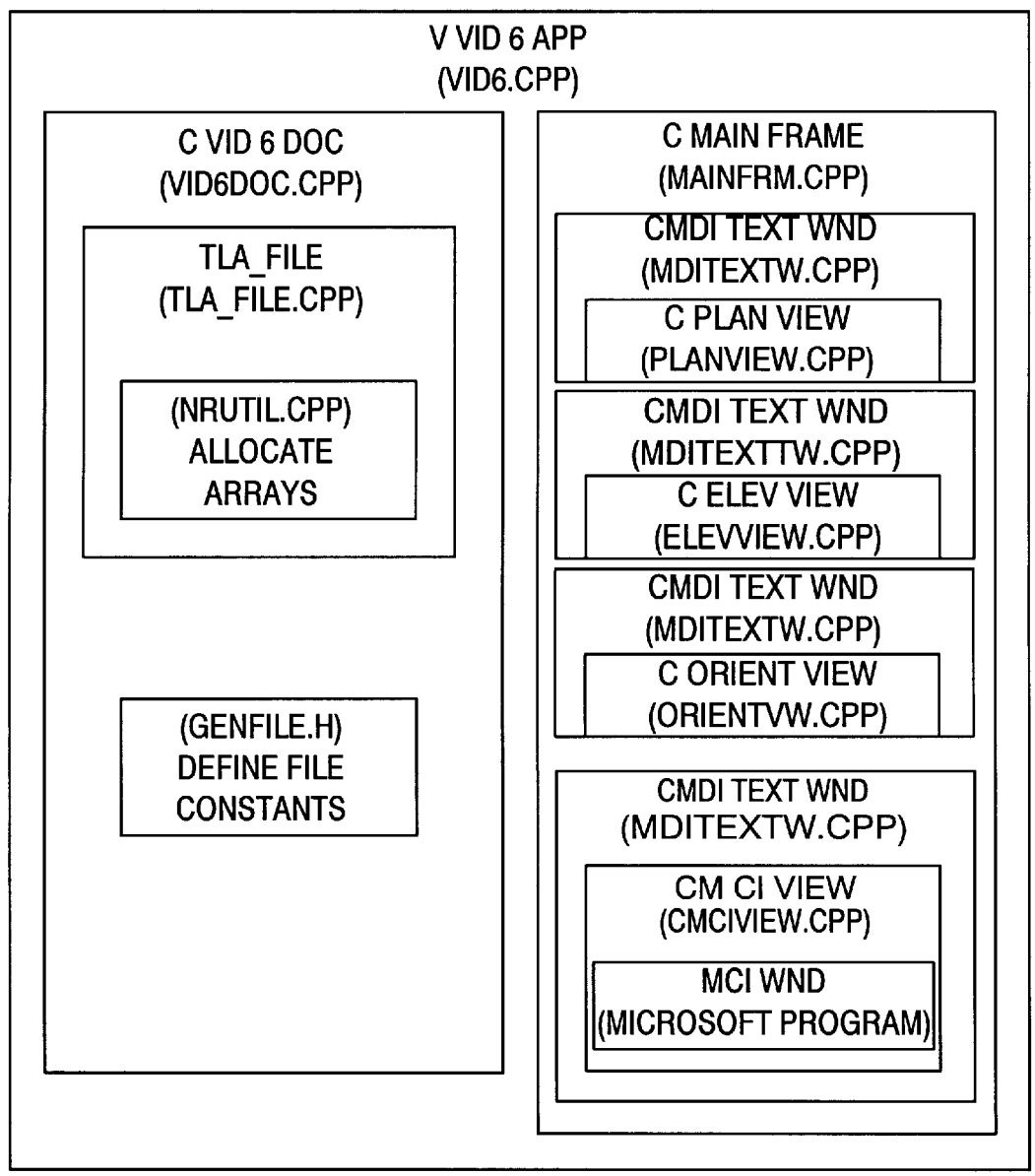
FIG. 29 is a block diagram illustrating the structure of program-generated objects in the movie mapper program 325 when it is in actual operation.
Figure 30:
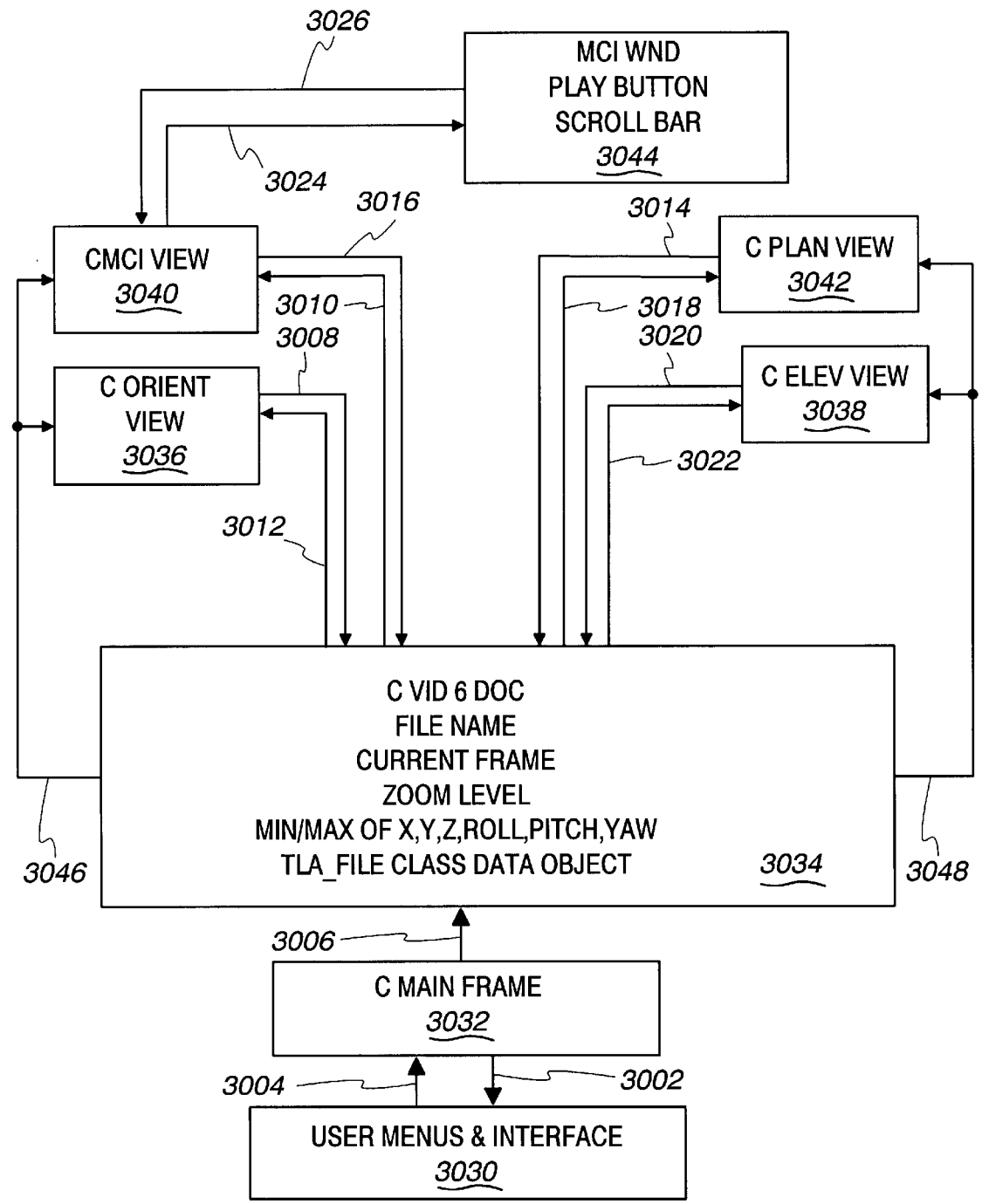
FIG. 30 is an information flow block diagram of the program-generated objects in the movie mapper program 325 illustrating how they communicate.
Figure 31:
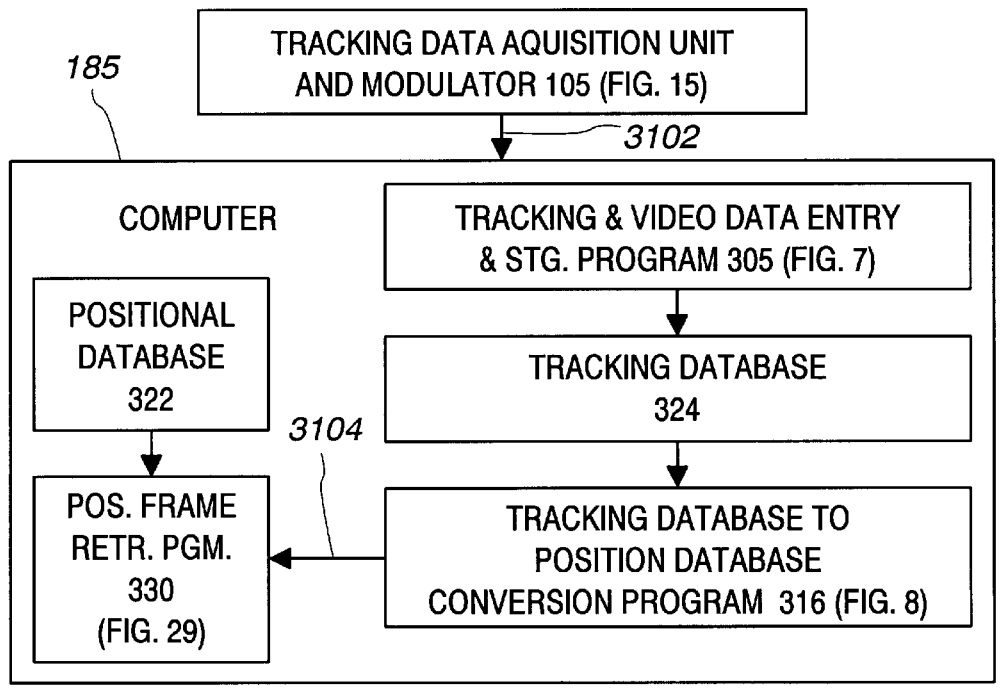
FIG. 31 is an alternate embodiment of the invention illustrating use of the tracking data acquisition unit and modulator 105 as a pointing and image retrieval device.

The program structure, defined by a series of nested objects, is depicted in overview in FIG. 29, and program details are set forth in the program listings which appear in Appendix C. The dynamics of event message transmission between objects is depicted in FIG. 30, and the most important data structures are depicted in FIG. 31. The operation of the program, as seen by the user, the window dynamics, and the program resources are depicted in FIGS. 25 to 29, which disclose a series of operating states of the program.

The program 325 is written in Microsoft C++to run under Microsoft Windows, Version 3.1. Complete listings are set forth in Appendix C of all programs not provided by Microsoft. Some of the programs call upon routines contained within the Microsoft Video For Windows Development Kit, Version 1.1. All of the above may be obtained from Microsoft Corporation, 1 Microsoft Way, Redmond, Wash. 98052. The Media Control Interface "MCIWind" 3044 from the Video For Windows package is used to control the scrolling through the playback of video images within the AVI (audio video interleave) video child window, MCIView 3040, described below. Many of the array processing routines presented within the program file TLA_FILE, as well as the vector, array, and tensor allocation programs found in the files NRUTIL.C and HRUTIL.H are taken from the book Numerical Recipes in C, 2nd Edition, by Press, Vetterling, Teukolsky, Flannery (Cambridge University Press, 1992) and from the program diskette that accompanies this book. (These routines have been placed in the public domain by the authors of the book).

Figure 25:
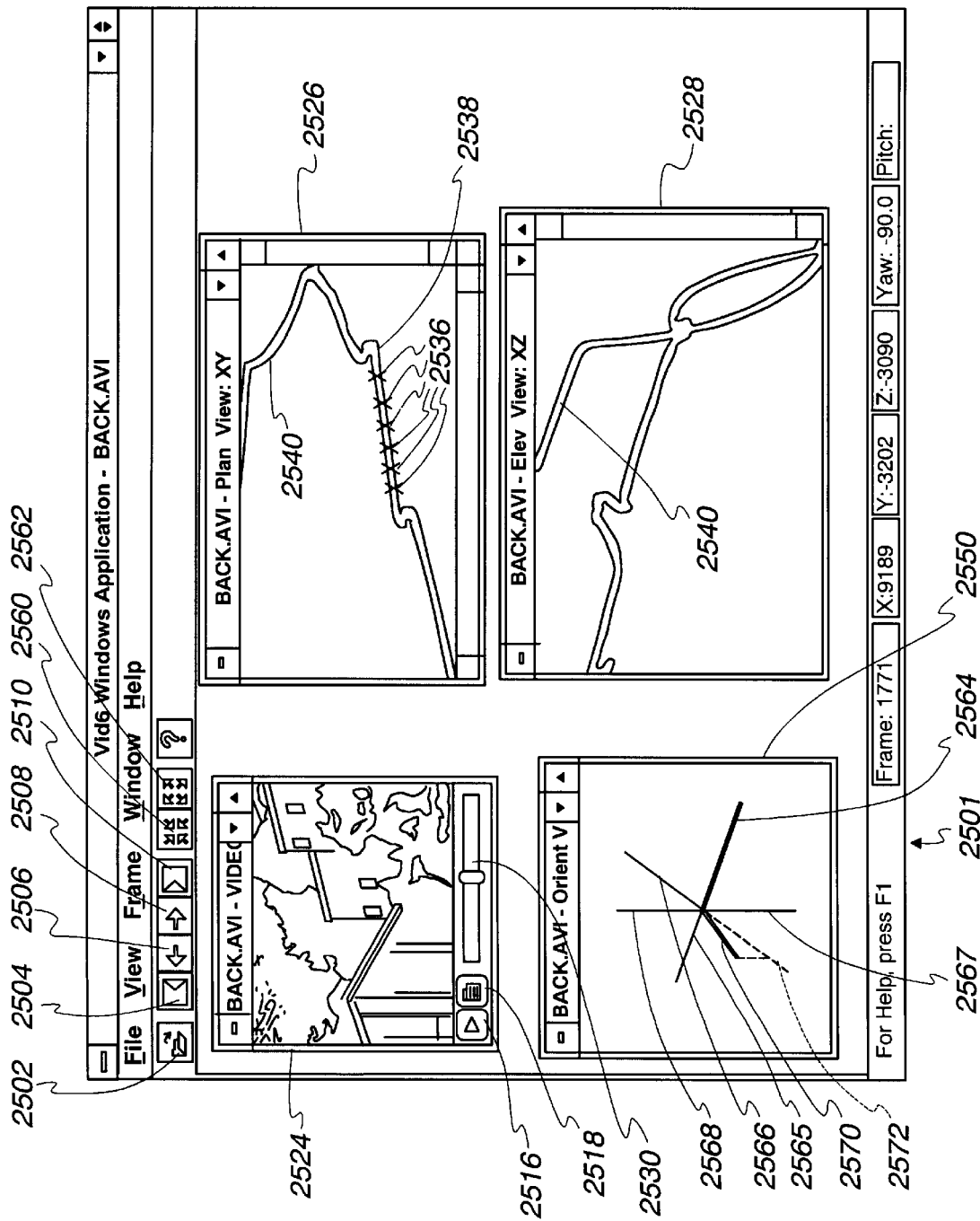
FIGS. 25 to 28 are computer screen snapshot views of the movie mapper program 325 in operation.
Figure 26:
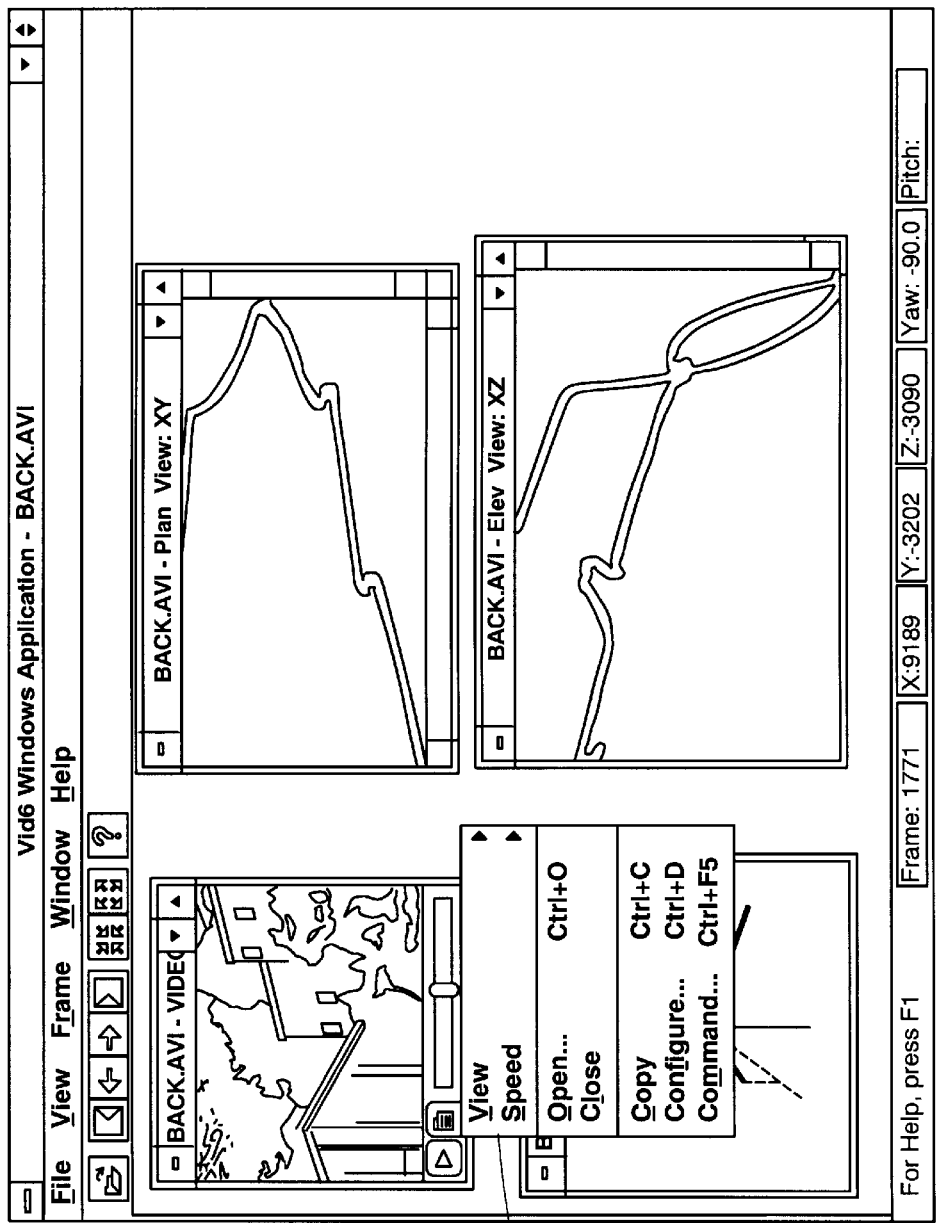
Figure 27:
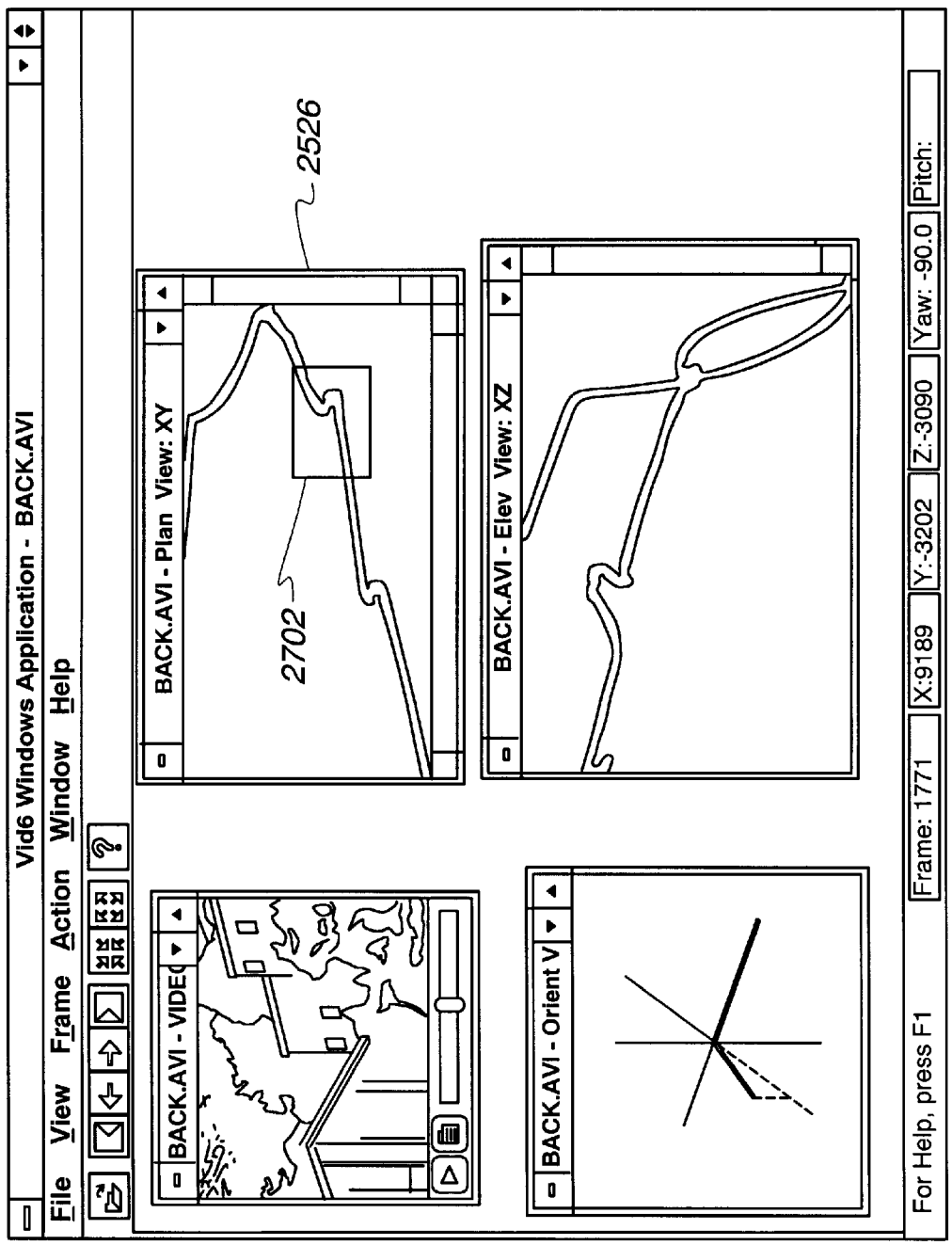

With reference to FIGS. 25 to 29, and beginning with FIG. 25, when the user turns on the movie mapper program 325, a main frame window 2501 opens up. The user first actuates the File popdown menu and calls for the display of an AVI file (a Microsoft Audio Video Interleave file).

These files, in the present version of the invention, have file names with the suffix ".AVI". In all respects, these files correspond to all of Microsoft's specifications.

The program 325 opens up the selected "*.AVI" file.

It also looks for and attempts to open a telemetry file, containing the positional information, which has the same name and the file name suffix "*.TLA". The "*.TLA" file must be prepared for this program by adding to the beginning of the file a single line of text. The line is "HDR<tab><last frame number>" where <tab> is the tab character, and <last frame number>is the first number on the last line of the file. If no "*.TLA" file is found, the system issues an error message but permits one to browse through the "*.AVI" file in the normal Microsoft manner. The File popdown menu contains the usual list of Microsoft options, including Open AVI, Print, Print Preview, Print Setup, Exit, and a numbered list of recently opened AVI files to facilitate recalling a file recently opened.

The figures illustrate what happens when an AVI file BACK.AVI and its corresponding telemetry file BACK.TLA were successfully opened. Upon opening this file, the program 325 causes a Video child window 2524 to be opened, displaying in this case a view of the back yard of a private home. This video window is labelled at the top with "BACK.AVI -Video" to identify both the file and the fact that this is the video child window. The child window 2524 provides controls that are standard Microsoft controls for scrolling through a sequence of video images. These include a VCR-like control 2516. Clicking on this control starts the video playback if it is stopped, and stops it if it is running. The control is marked with a square when the video is playing, and it is marked with a triangle (shown) when tie video is stopped. A button 2518 is provided that brings up standard Microsoft Video For Windows video formatting (window size, zoom, etc) and playback (speed, etc.) controls (not shown). When this button is pressed, a menu 2610 (FIG. 26) appears that allows the user to change the window size and the playback speed as well as adjust various video configuration options. A mouse-actuated slider control 2530 (FIG. 25) permits the user to position the video playback to any frame of the temporal video sequence. All of these functions are provided by Microsoft's utilities.

A View pulldown menu permits additional child windows to be opened that relate to the position information. The View menu provides the following options, which are described below:

Plan

Elevation

Orientation

Toolbar

Status

Activating the Plan command causes a plan view: XY child window 2526 to open up, displaying the path 2540 over which the camera was moved during the process of recording the sequential images. This window is labelled: "BACK.AVI—Plan View: XY" to identify the file name as well as the nature of the view. While not clearly visible in FIG. 25, a red dot 2538 identifies the precise position along the path 2540 where the camera was positioned when it recorded the image shown in the view window 2524. When the "Play" button 2516 is pushed to commence a sequential playback of images, a series of red dots 2536 (again not clearly shown in FIG. 25) indicate the camera's track. These red dots are spaced apart to produce a dotted line effect following the path of the camera as it moves along the path in the X and Y directions. The color of the remaining points along the track is blue.

Activating the Elevation command causes an Elevational View: XZ child window 2528 to open up, displaying the camera path of movement as seen from the side, rather than from the top. The display in all other respects is identical to the plan view display just described.

By clicking twice upon a point on the camera path in either the child window 2526 or 2528, the user may signal the program to switch to displaying the image closest to the point where the mouse pointer was clicked. This selection process provides a rapid method for retrieving and positioning the video for playback based upon the position of the camera when the images were captured.

Activating the Orientation View command causes a fourth child window 2550 to open up, displaying the orientation of the camera (pitch, roll, and yaw) graphically. Unfortunately, the absence of colors in FIG. 25 makes the figure less than clear. The positive Y direction is indicated by the line 2564, with the negative Y direction indicated by the line 2565. Note that the line 2564 indicating positive Y is bold, to serve as a reference line. The positive X direction is indicated by the line 2566, and negative Z is indicated by the line 2572. The positive Z direction is indicated by the line 2568, and the negative Z direction is indicated by the line 2567.

The actual direction of the camera, when it captured the image shown in the child window 2524, is indicated by the line 2570, which appears half in red and half in blue in the actual program display (and does not match the bold black line 2564). The dotted line 2572 is a projection of the camera direction line 2570 onto the X-Y plane. In the case of the illustrative figures, the dotted line 2572 just happens to coincide with the negative X line, so no separate negative X line is shown. Normally, a solid negative X line would be visible in the child window 2550. As a sequence of images is displayed in response to actuation of the play control 2516, the red-blue line 2570 swings about, indicating the orientation of the camera, and the dotted line 2572 swings about below (or above) the line 2572 like a shadow at noontime on the equator.

Roll is represented by the ratio of blue and red portions of the line 2570. If the roll value is zero, then the line is half red and half blue. Roll in a clockwise direction increases the blue, while roll in a counterclockwise direction increases the red. A positive roll gives more red.

A toolbar containing push button controls (2502, 2504, etc.) appears in the window 2501 and may be selectively displayed or hidden by actuating the Toolbar command in the View pulldown menu. The push button 2502 is an alternate way to open a file. The push buttons 2504 and 2510 respectively wind to the first and the last frames, and the push buttons 2506 and 2508 respectively move back and forward by one frame at a time.

The push button 2560 zooms in, and the push button 2562 zooms out. These two push buttons control the portion of the video path that is displayed by the Plan View and Elevational View child windows 2526 and 2528. To zoom in, and with reference to FIG. 27, the user uses the mouse to position the cursor and then, with the left mouse button held down, drags the cursor diagonally so that a mouse-defined rectangle 2702 is created within the child window 2526. The user then clicks the zoom in push button 2560. The Plan View: XY window's contents are then replaced by the contents of the marked rectangle, expanded out to fill the window (FIG. 28). The Elev View: XZ window's X axis is simultaneously zoomed, while the Z axis (vertical) is left as before. The points in the YZ view which were outside the rectangle 2702 are excluded from the elevational view. This process may be repeated as often as desired, until only a few camera positions are shown individually in the display. While not shown in the program listings, zooming out to a previous level of zoom is planned for future versions of the program.

The user may also create a rectangle within the Elev: XZ window, if desired. When the zoom-in push button 2560 is actuated, the selected rectangle fills the XZ window, and the X axis of the XY window is zoomed in the X axis only. Points not within the XZ selection rectangle are then excluded from the elevational view.

Actuation of the zoom-out push button 2562 causes the plan and elevational displays to return to their original appearance (as shown in FIG. 25).

The final command in the View popdown menu is the Status command, which hides or displays a status line at the bottom of the window 2501 and which indicates such things as the frame number and the X, Y, Z, Yaw, Pitch, and Roll coordinates of the camera corresponding to the image that is being displayed. The Frame popdown menu displays the following commands, all of which relate to simply positioning the video as if it were a continuous video tape recording:

Home
Back
Forward
End

The Window popdown menu provides conventional Microsoft Windows window control functions that need not be described here. The Help popdown menu also needs no special explanation. The object program structure of the movie mapper program 325 is described in overview in FIG. 29, and the message paths connecting these program object elements are shown in FIG. 30. Taken together, and in conjunction with the preceding figures that illustrate the windows and program operation, FIGS. 25 to 30 present a full overview of the program 325 the details of which are set forth in Appendix C.

The operating program is composed of a number of objects each of which is an instance of some class of objects. These objects are represented by rectangles in FIGS. 29 and 30. Objects sometimes create subsidiary objects. When this happens, the subsidiary objects are represented in FIG. 29 by smaller rectangles contained within the larger object rectangles that gave rise to them. Each object has properties which correspond to its particular class. Each object class has a name, and the properties of the class are defined by separate program listings for each class which are set forth in Appendix D. To aid the reader in pursuing these programs, FIG. 29 presents the hierarchical arrangement of the objects that are present in the program 325 when it is actually operating. The class name of each object appears within the rectangle for the object, and the name of the program file which defines that particular class of objects is set forth in parenthesis immediately following the name of the object in FIG. 25. These programs appear in Appendix C arranged alphabetically. Each program appears as two files—a program file with a ".C" or "*.CPP" suffix, and an "include" program segment with an "*.H" suffix for the name of the file. (The file "GENFILE.H" has no corresponding program and simply defines data values.)

When the program commences operating, it first appears as an object named CVid6App (FIG. 29). This object then creates a frame window derived from the Microsoft class CMainFrame. This CMainFrame object appears on the screen as a large window frame (see FIG. 25) that includes a menu bar, a tool bar, and a status line, as has been described.

This CMainFrame object next launches a child frame derived from Microsoft's CMDIChildWnd that is of the class CMDITextWnd. This object gives rise to a child window that is modified from the Microsoft original in that its title line (positioned above the window) may be dynamically altered while the program is in operation.

This first child object launches within itself an instance of the CMciView object, which launches MCIWnd to display the sequence of video images. This is the lower-most of the four objects shown in FIG. 29 within the CMainFrame object. Accordingly, the user sees upon the screen a large window 2501 (FIG. 25) within which a small window 2524 appears having video scrolling and playback controls 2516, 2518, and 2530.

Three more windows may be opened by the user through activation of the View popdown menu, as has been described. Each of these windows corresponds to an additional pair of nested objects which appear within the CMainFrame object shown in FIT. 29.

If the user opens the Plan View: XY window 2526 (FIG. 25), then the object CMDITextWnd containing the object CPlanView is created within the CMainFrame object, and this pair of objects together create the child window shown at 2526 in FIG. 25. If the user opens the Elev View:XZ window 2528, then the object CMDITextWnd containing the object CElevView is created within the CMainFrame object, and this pair of objects together create the child window shown at 2528 in FIG. 25. If the user opens the Orient View window 2550, then the object CMDITextWnd containing the object COrientView is created within the CMainFrame object, and this pair of objects together create the child window shown at 2550 in FIG. 25. As the user closes the windows, the corresponding pairs of objects are destroyed.

The objects, once created, send messages back and forth to each other over the paths illustrated in FIG. 30. The following discussion does not consider messages directed to the window frames (to adjust the frame size, for example) and to the child window frame object instances CMDITextWnd, which are not shown to simplify FIG. 30.

When the user "talks" to the program, using the keyboard or mouse, in general, the user communicates with the active window (in the case of the keyboard) or the window that the mouse is in (in the case of the mouse), selecting a different active window by clicking within the window boundaries. The five windows shown in FIG. 25 to which the user "talks" correspond to the objects numbered 3030, 3036, 3038, 3042, and 3044 in FIG. 30. So these five objects receive messages from the user and must respond to them.

The central coordinating object is the document object, which is an instance of CVid6Doc which is derived from the class CDocument (a Microsoft class). This object contains the key system variables that determine the state of the system. Included, as illustrated in FIG. 30, are the name of the file being processed, the number of the current frame being displayed, the current zoom level, the minimum and maximum values of coordinates that are used in the displays, and an object which is an instance of the class Tla_File which stores and manipulates the positional data. (The minimum and maximum values of the coordinates are derived from the file data itself as the extreme values found within this object.)

If any window receives a message that calls for adjustment of one of the key system variables, that message is sent immediately to the document object CVid6Doc 3034. The value of the key variable is adjusted, and then the document object 3034 broadcasts an "Update All Views" message over the broadcast paths 3046 and 3048 to the child window objects. They respond accordingly. The "Update All Views" message contains a hint that says either:

1. Rewrite Everything, or
2. Just Do Current Frame.

The "rewrite everything" hint causes each window to be redrawn completely. The "just do current frame" hint causes, for example, just one point to be changed from blue to red.

The individual window objects next communicate with the document object 3034 over bidirectional paths 3008 and 3012, 3010 and 3016, 3014 and 3018, and 3020 and 3022 to learn of the new state of the system and to retrieve from ;the document object 3034 whatever data they need to update their respective windows. For example, if the user at 3030 clicks upon the "zoom out" push button 2562 (FIG. 25), this action is communicated to the object CMainFrame 3032 associated with the outer window frame.

The object 3032 communicates this message over the path 3006 to the document object 3034. The Zoom Level variable is updated within the object 3034, and an "Update All Views—Rewrite Everything" message is broadcast over the paths 3046 and 3048 to the remaining objects. Then each of the objects 3038, and 3042 must send messages to the document object 3034 requesting all of the positional information (from "Tla_File") so that they may repaint their plots of camera motion. They also request the current frame number so that they can color the plot of the current frame position red in color. The object 3036, which simply needs to recompute and display the camera's orientation when capturing the current frame, simply requests the current frame number and the positional data relevant to that one frame. The object 3040, after verifying that the current frame value has not changed, simply does nothing in this case.

Double clicking on the path in one of the two windows 2526 or 2528 (FIG. 25) causes one of the two objects 3042 or 3038 to send a message to the document object 3034 reporting a new value for the current frame number. In response, the document object broadcasts over the paths 3046 and 3048 the message "Update All Views—Rewrite Everything" to the objects 3036, 3038, 3040, and 3042. In response, the objects 3038 and 3042 redraw their plots totally, requesting the necessary data from the document object 3034. The CMciView object 3040, after determining that the current frame had changed, would request the display of the designated new frame by the MCIWnd object from Microsoft 3044. When the user clicks upon one of the positioning controls 2504, 2506, 2508, or 2510 in the tool bar (FIG. 25), these actions are communicated over the path 3004 to the CMainFrame object 3032 which, in a similar manner, sends a frame update message over the path 3006 to the document object 3034 and triggers a similar response to that just described.

When the user activates the video controls within the child window 2524 (FIG. 25) that contains the video image, the user is communicating directly with the Microsoft MCIWnd object 3044. This object updates the display of the image as requested and sends a message indicating the new frame number to the object CMciView 3040. The object 3040 must then communicate this frame number to the document object 3034 over the path 3016.

In this case, if the MCIWnd viewer is playing the video as an animated display, then the document object 3034 broadcasts a message over the paths 3046 and 3048 "Update All Views—Just Do Current Frame.". Accordingly, the objects 3042, 3038, and 3036 need simply to request information concerning the new current frame.

Two other display programs are available for viewing the information stored in the positional database.

The spatial database program 335 is controlled by a three-dimensional navigation tool, such as the SUN COM FLIGHT MAX JOY STICK, or any three-dimensional, commercially available game control device. Each frame is displayed, and the user is asked whether he wants to select it. A database of frames selected for display is created. For each frame, a two-dimensional rectangle of fixed size is drawn using the WORLD TOOL KIT in a perspective view of three-dimensional space. The rectangle is displayed in the simulation space in the orientation specified by the attitude of the camera positional frame record that corresponds to the video frame. The rectangle is then textured with the video frame so the frames appear to float in space before the user.

The positional frame retrieval program 330 allows the user to identify a region in space on the camera path using the WORLD TOOLKIT. The program defines a rectangular solid in space about each imaged object. The location of each item imaged is computed from the data in each record. All the image records where the location of the item image falls outside of the rectangular solid for an item are discarded, and all remaining records are displayed as a movie view of the item from different perspectives. In essence, all available frames showing the item or the volume indicated are displayed sequentially, giving all the views available of the desired item or volume.

The data tracking and acquisition unit and modulator 105 has illustratively been shown connected to a rangefinder, receiving therefrom a serial data signal which is conveyed to the central computer for possible use in a data retrieval system. The positional frame retrieval program 330 uses this range data to determine the position of imaged objects and to retrieve all images containing a designated object, as contrasted with the movie mapper program technique of retrieving images based upon camera position and orientation.

Figure 32:
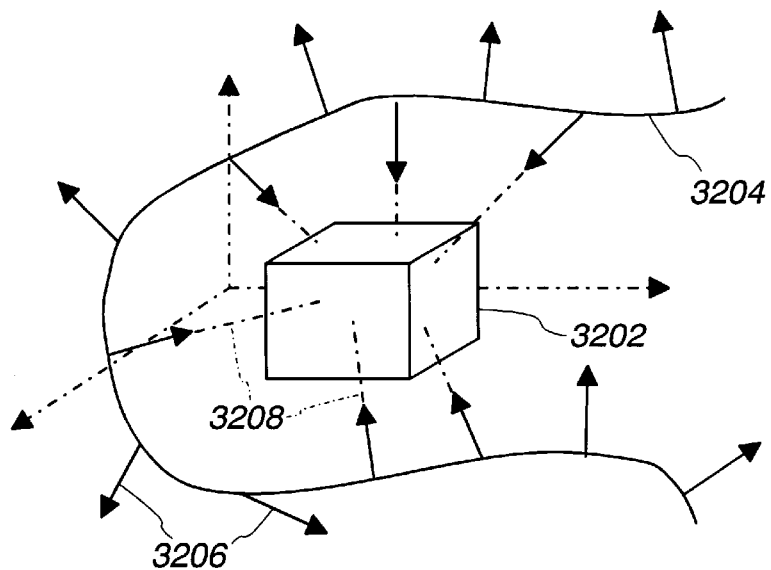
FIG. 32 illustrates the operation of the positional frame retrieval program 330 in which range information is added so that all of the images viewing a selected object 3202 may be located and retrieved, as a group.

For example, in FIG. 33, an object 3202 is shown within a camera path 3204 along which the camera orientation at the moment of image capture is indicated by vectors 3206. In FIG. 32, the vectors shown connected by dotted lines 3208 to the object 3202 represent the capture of an image of the object 3202. Range information is also captured indicating how far the object 3202 is from the camera at each of these points.

The range data is preserved in the positional database 322 for this embodiment of the invention. Accordingly, the retrieval program 300, in response to a mouse click at the position of the object, may locate all records 775 which, from position, camera angle, and distance to subject, relate to images of that object. These may be grouped into an object database and displayed as a video movie, as described above. In addition to a rangefinder, other devices may be attached to the serial data input of the tracking data acquisition unit and modulator 105, and data may be captured from these other devices. For example, data may be captured from a gas chromatograph or from a chemical sniffer. Sound may be recorded from a microphone.

Average light intensity may be recorded from a photo cell. Infrared records of motion in the vicinity may be recorded. Data may be gathered from stationary machinery or data collection devices, such as flow meters or temperature sensors. Any type of data that has a spatial reference may be gathered in this manner.

Another embodiment of the invention is shown in FIG. 31. The computer 185 contains a positional database 322 established previously, in accordance with the teachings set forth above. The positional frame retrieval program 330 is actively retrieving images from the databases 322 and displaying them as illustrated in FIG. 25.

In this embodiment, the tracking data acquisition unit and modulator 105 is not attached to the camera, but is attached by a serial communicator tether 3102 (which could include a radio linkage) directly to the serial port of the computer 185, such that the tracking and video data entry and storage program continuously accepts the data and stores it in the tracking database 324. The tracking data acquisition unit is thus enabled to be used as a mouse pointing device for the positional frame retrieval program 330.

The tracking database 324 may be on the hard disk as previously, but preferably it is a RAM circular buffer that is shared by the tracking database to positional database conversion program 310. Alternatively, the tracking data values may be sent as messages between the two programs running under Windows and subject to the standard Windows message dispatcher (not shown). Both of the programs 305 and 310 can be simplified, since neither is dealing with video or with frame numbers in this embodiment.

The tracking database to positional database conversion program operates continuously, receiving tracking data containing unnormalized acceleration and orientation data and converting it into normalized position and orientation data, and sending the resulting data directly to the document object CVi6DOC 3034 (FIG. 29) within the positional frame retrieval program 330, thereby causing the program 330 to update the display continuously in response to manual movement of the tracking data acquisition unit and modulator 105 through time and space.

As an alternative, two computers can be utilized.

A first portable computer (not shown) can be attached to the tracking data acquisitional unit and modulator 105 can contain the program elements 305, 324, 310 and 330, shown in FIG. 31. This computer continuously computes the coordinates and position of itself in time and space and broadcasts this information by means of a radio LAN or serial port, for example, to a stationary computer that contains the positional database 322. The stationary computer broadcasts back the database information to the portable computer, where it is displayed. In this manner, a virtual world can be created where the one carrying around the portable computer can view a universe that exists in virtual form on the disk and that was recorded earlier at this or some other location.

As a third alterative, the tracking data acquisition unit and modulator 105 in FIG. 31 can be equipped with a video monitor receiving video signals from the computer 185 (by television transmission over a radio link, for example). Then one may wander about with the television and tracking data acquisition unit viewing a virtual reality derived from the positional database 322.

The arrangement illustrated in FIG. 31 can also be used as a three-dimensional pointing device for programs other than the positional frame retrieval program. Any kind of three-dimensional software program requiring the assistance of a navigation tool having either three or six degrees of freedom may be readily modified to accept the positional data records generated at 3104 by the tracking data acquisition unit and modulator 105.

While the preferred embodiment of the invention has been described, it will be understood that numerous modifications and changes will occur to those skilled in the art. It is therefore intended by the appended claims to define the true scope of the invention.

What is claimed as new and desired to be secured by letters patent of the united states is:

1. A spatially referenced camera comprising:
   a camera capable of capturing data representative of plural images of objects;
   a camera orientation sensor connected to said camera and generating data defining the orientation of said camera;
   a position sensor which includes a plurality of accelerometers rigidly attached to said camera and generating data defining the position of said camera when each image is captured, said position defining data needing adjustment relative to said orientation defining data to compensate for camera orientation during motion; and
   a data capture device that captures image representation data from said camera, position defining data from said position sensor, and orientation defining data from said orientation sensor and that stores said data.

2. A spatially referenced camera in accordance with claim 1 wherein the camera is a video camera.

3. A spatially referenced camera in accordance with claim 2 wherein the data capture device utilizes a magnetic storage medium having the capacity to store video images.

4. A spatially referenced camera in accordance with claim 1 wherein said spatially referenced camera, position sensor, and orientation sensor are integrated into a single compact, portable unit.

5. A spatially referenced camera in accordance with claim 1 wherein the data capture device utilizes magnetic storage medium, and wherein said image representation data from said camera and said position and orientation defining data are stored on portions of said magnetic storage medium with the position and orientation defining data associated with the corresponding image representation data.

6. A spatially referenced camera in accordance with claim 1 wherein said accelerometer data must be integrated twice and corrected for camera orientation during motion to convert it into data indicating camera position.

7. A spatially referenced camera in accordance with claim 1 wherein said orientation sensor comprises gyroscopes.

8. A spatially referenced camera in accordance with claim 7 wherein said gyroscopes are rigidly attached to said camera, and where said camera orientation defining data is derived from rotational forces applied to and sensed by said gyroscopes.

9. A spatially referenced camera in accordance with claim 1 wherein said orientation and position defining data is captured by a microprocessor-based tracking data acquisition unit, bundled into digital packets suitable for transmission, and transmitted to said data capture device.

10. A spatially referenced camera in accordance with claim 1 which further includes a range finder attached to said camera for generating range data indicating the distance to said objects, and wherein said range data is also captured by said data capture device.

11. A spatially referenced camera in accordance with claim 10 wherein object position computational means are provided to compute the position of said objects from said range, orientation defining, and position defining data.

12. A spatially referenced camera in accordance with claim 1 to which is added a computer which accepts all the data from said data capture device and which includes image retrieval and display means for facilitating the retrieval of the data representative of any of said images, and the display of the images, based on the position of the camera when the image data was captured, said retrieval and display means utilizing data provided by said data capture device to control the display of visual navigation aids to one viewing the images on the display means.

13. A spatially referenced camera comprising:
   a video camera and data recorder capable of capturing video data representative of plural images of objects and storing said video data on a magnetic storage medium:
   orientation sensing gyroscopes rigidly attached to said camera by means of gimbals and generating gimbal rotational position data to serve as camera orientation defining data;
   position sensing accelerometers rigidly attached to said camera to define the position of said camera when each image is captured,
   a processor programmed to use said orientation defining data to adjust accelerometer-generated position defining data to compensate for camera orientation during motion; and
   a tracking data acquisition unit attached to said camera and arranged to receive said position and orientation defining data and to present said data for storage on said magnetic storage medium.

14. A spatially referenced camera in accordance with claim 13 which further includes processor means for double integrating said position de fining data in to data indicating camera position.

15. A spatially referenced camera in accordance with claim 13 to which is added a computer which accepts all the data from said data acquisition unit and which includes image retrieval and display means for facilitating the retrieval of the data representative of any of said images, and the display of the image, based on the position of the camera when the image data was captured, said retrieval and display means utilizing data provided by said data acquisition unit to control the display of visual navigation aids to one viewing the images on the display means.

16. A spatially referenced camera in accordance with claim 15 which further includes a range finder rigidly attached to said camera and generating range data defining the range to objects being photographed by said camera, which data is also received by said tracking data acquisition unit.

17. A spatially referenced camera in accordance with claim 16 which further includes processor means for adjusting said accelerometer-generated position defining data to compensate for camera orientation using said orientation defining data, for double integrating said position defining data into data indicating camera position, and for computing from said data indicating camera position, said orientation defining data, and said range data the position of said photographed objects.

18. A spatially referenced camera in accordance with claim 17 to which is added a computer that accepts video data from said data acquisition unit and object position data computed by said processor means and which includes image retrieval and display means for facilitating the retrieval of the data representative of any of said images, and the display of the images, based on the position of the object when the image data was captured.

19. A spatially referenced camera comprising:

a cameral capable of capturing data representative of plural images of objects;

an orientation sensor connected to said camera for capturing data defining the orientation of said camera, said orientation of said camera including rotation about three axes of rotation;

a position sensor which includes a plurality of accelerometers rigidly attached to said camera to define the position of said camera when images are captured, said position sensor adapted to be adjusted relative to said orientation defining data to compensate for camera orientation during motion; and a data capturing device that receives image representation data from said camera, position defining data from said position sensor, and orientation defining data from said orientation sensor and for storing all of said data.

* * * * *